United States Patent
Suyama et al.

(10) Patent No.: US 8,050,819 B2
(45) Date of Patent: Nov. 1, 2011

(54) ALIGNMENT CHANGING CONTROL DEVICE AND FUEL CONSUMPTION MANAGEMENT DEVICE

(75) Inventors: Koichi Suyama, Wako (JP); Akiyoshi Kobayashi, Wako (JP); Yutaka Horiuchi, Wako (JP); Kenji Hattori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 920 days.

(21) Appl. No.: 12/031,400

(22) Filed: Feb. 14, 2008

(65) Prior Publication Data

US 2008/0201037 A1 Aug. 21, 2008

(30) Foreign Application Priority Data

Feb. 16, 2007 (JP) ................. 2007-035672
Jul. 3, 2007 (JP) ................. 2007-175128

(51) Int. Cl.
*B60G 17/018* (2006.01)
*B60G 23/00* (2006.01)
*B62C 3/00* (2006.01)
*B62K 25/00* (2006.01)
*G06F 17/00* (2006.01)
*G06F 19/00* (2011.01)

(52) U.S. Cl. ............... 701/37; 701/38; 701/65; 280/5.5; 280/5.52; 280/5.522

(58) Field of Classification Search .............. 701/37, 701/38, 48, 65, 200; 280/5.5, 5.512, 5.517, 280/5.52, 5.521, 5.522
See application file for complete search history.

(56) References Cited

U.S. PATENT DOCUMENTS

| 4,752,079 | A | | 6/1988 | Fahrner |
|---|---|---|---|---|
| 5,076,606 | A | * | 12/1991 | Takahashi ............. 280/124.161 |
| 5,088,321 | A | * | 2/1992 | Kajikawa et al. ............... 73/146 |
| 5,620,199 | A | * | 4/1997 | Lee ........................ 280/5.521 |
| 6,164,405 | A | * | 12/2000 | Sakata ...................... 180/400 |
| 6,386,553 | B2 | | 5/2002 | Zetterstrom |
| 7,104,122 | B2 | * | 9/2006 | Kurai et al. ................... 73/146 |
| 7,729,829 | B2 | * | 6/2010 | Messih et al. .................. 701/37 |
| 7,766,344 | B2 | * | 8/2010 | Buma ...................... 280/5.511 |
| 2005/0090956 | A1 | * | 4/2005 | Ogawa ......................... 701/37 |
| 2005/0269179 | A1 | * | 12/2005 | Hashimoto ............. 188/322.16 |
| 2008/0275607 | A1 | * | 11/2008 | Ammon et al. ................. 701/38 |

FOREIGN PATENT DOCUMENTS

| JP | 62-125952 | 6/1987 |
|---|---|---|
| JP | 62-178407 | 8/1987 |
| JP | 63-500444 | 2/1988 |
| JP | 04-46966 | 11/1992 |
| JP | 05-077626 | 3/1993 |
| JP | 11-051665 | 2/1999 |
| JP | 2005-172582 | 6/2005 |
| WO | WO 2005080102 A1 * | 9/2005 |

* cited by examiner

*Primary Examiner* — Hussein A. Elchanti
*Assistant Examiner* — Rami Khatib
(74) *Attorney, Agent, or Firm* — Rankin, Hill & Clark LLP

(57) ABSTRACT

A toe angle changing control ECU for controlling a toe angle of wheels of a vehicle. The toe angle changing control ECU includes: a straight traveling state judging section for judging whether or not the vehicle is in a; a memory for storing the toe angle of the wheels while the vehicle is in the straight traveling state; and a toe angle setting section for setting the wheels to the toe angle stored in the memory (44) when the straight traveling state judging section judges that the vehicle is in the straight traveling state. While in the straight traveling state, the wheels are set to a toe angle at which the wheels are substantially parallel to the longitudinal direction of the vehicle, reducing the rolling resistance of the wheels, and improving fuel consumption.

2 Claims, 23 Drawing Sheets

49a FUEL CONSUMPTION TABLE

| NUMBER | TOE ANGLE | FUEL CONSUMPTION (km/ℓ) | START TIME | END TIME |
|---|---|---|---|---|
| 1 | +0.1 | 15.0 | 01/19/07 8:00:00 | 01/19/07 8:03:00 |
| 2 | +0.2 | 15.1 | 01/19/07 8:05:00 | 01/19/07 8:08:00 |
| 3 | +0.3 | 15.2 | 01/19/07 8:10:00 | 01/19/07 8:13:00 |
| 4 | +0.4 | 15.1 | 01/19/07 8:15:00 | 01/19/07 8:18:00 |
| 5 | +0.5 | 14.9 | 01/19/07 8:20:00 | 01/19/07 8:23:00 |
| ⋮ | ⋮ | ⋮ | ⋮ | ⋮ |

70a TRAVELING HISTORY TABLE

| NUMBER | START NODE | END NODE | LINK ID | ROUTE | START TIME | END TIME |
|---|---|---|---|---|---|---|
| 1 | a1 | a2 | LA1 | A1 | 01/12/07 8:00:00 | 01/12/07 8:10:00 |
| 2 | a2 | a3 | LA2 | A2 | 01/12/07 8:10:00 | 01/12/07 8:20:00 |
| ... | ... | ... | ... | ... | ... | ... |
| 41 | b1 | b2 | LB1 | B1 | 01/14/07 9:00:00 | 01/14/07 9:05:00 |
| 42 | b2 | b3 | LB2 | B2 | 01/14/07 9:05:00 | 01/14/07 9:10:00 |
| ... | ... | ... | ... | ... | ... | ... |
| 66 | a1 | a2 | LA1 | A1 | 01/15/07 7:59:00 | 01/15/07 8:09:00 |
| 67 | a2 | a3 | LA2 | A2 | 01/15/07 8:09:00 | 01/15/07 8:19:00 |
| ... | ... | ... | ... | ... | ... | ... |

49b SAME ROUTE FUEL CONSUMPTION TABLE

⟨ SAME ROUTE A1 ⟩

| NUMBER | TOE ANGLE | FUEL CONSUMPTION (km/ℓ) | START TIME | END TIME |
|---|---|---|---|---|
| 1 | +0.1 | 15.0 | 01/15/07 8:00:00 | 01/15/07 8:03:00 |
| 2 | +0.2 | 15.1 | 01/16/07 7:59:00 | 01/16/07 8:02:00 |
| 3 | +0.3 | 15.2 | 01/17/07 8:01:00 | 01/17/07 8:04:00 |
| 4 | +0.4 | 15.1 | 01/18/07 8:00:00 | 01/18/07 8:03:00 |
| 5 | +0.5 | 14.9 | 01/19/07 8:00:00 | 01/19/07 8:03:00 |
| ⋮ | ⋮ | ⋮ | ⋮ | ⋮ |

49c INTER-REFUELING FUEL CONSUMPTION TABLE

| NUMBER | TOE ANGLE | FUEL CONSUMPTION (km/ℓ) | REFUELING QUANTITY (ℓ) | TOTAL TRAVELING DISTANCE (Km) | TIME WHEN REFUELING QUANTITY IS INPUT |
|---|---|---|---|---|---|
| 1 | +0.1 | 15.0 | 80 | 10,000 | 01/19/07 18:03:00 |
| 2 | +0.2 | 15.1 | 80 | 11,208 | 01/26/07 18:12:00 |
| 3 | +0.3 | 15.2 | 80 | 12,424 | 02/02/07 17:51:00 |
| 4 | +0.4 | 15.1 | 80 | 13,632 | 02/09/07 18:01:00 |
| 5 | +0.5 | 14.9 | 80 | 14,824 | 01/16/07 17:55:00 |
| ... | ... | ... | ... | ... | ... |

ALIGNMENT CHANGING CONTROL DEVICE AND FUEL CONSUMPTION MANAGEMENT DEVICE

CROSS-REFERENCE TO RELATED APPLICATION(S)

This application claims the foreign priority benefit under Title 35, United States Code, §119 (a)-(d), of Japanese Patent Application No. 2007-175128 filed on Jul. 3, 2007 in the Japan Patent Office, the disclosure of which is herein incorporated by reference in its entirety.

BACKGROUND OF THE INVENTION

1. Field of the Invention

The present invention relates to an alignment changing control device for controlling the alignment of wheels of a vehicle such as the toe angle of the wheels, and a fuel consumption management device.

2. Description of the Related Art

When a vehicle is newly shipped from an auto manufacturer, the toe angle of the wheels (particularly the rear wheels 2L, 2R) is such set that the vehicle has a good traveling stability. However, the toe angle set in such a manner does not necessarily provide optimum fuel consumption. For example, if the wheels are set to toe-in, the rolling resistance of the wheels during travel will increase.

If the wheels are set to toe-in, the toe angle of the left and right wheels need be independently controllable, as disclosed in Japanese Patent Publication No. Hei06-47388 (refer to claim 1, FIG. 2, etc.) which discloses an all-wheel independent steering device. Thus, the wheels can not be set to toe-in if the left and right wheels are connected by a steering mechanism of the vehicle. Further, Japanese Patent Laid-Open Publication No. Hei11-51655 (refer to paragraph [0037], etc.) discloses a traveling course estimating device for vehicle, in which the fuel consumption is improved by controlling the speed change using a navigation device.

However, both patent documents have not mentioned the aforesaid problem, namely, the optimum fuel consumption can not be obtained by setting the wheels to toe-in, which means there is still room for improving the fuel consumption.

SUMMARY OF THE INVENTION

An object of the present invention is to improve the fuel consumption by controlling the alignment of the vehicle wheels such as the toe angle.

An aspect of the present invention is to provide an alignment changing control device for controlling an alignment of wheels of a vehicle, the alignment changing control device including: a straight traveling state judging means for judging whether or not the vehicle is in a straight traveling state based on detection results of traveling condition of the vehicle; an alignment storage means for storing an alignment suitable for improving the fuel consumption while the vehicle is in the straight traveling state; and an alignment setting means for setting the wheels to the alignment stored in the alignment storage means when the straight traveling state judging means judges that the vehicle is in the straight traveling state.

With such a configuration, the wheels can be set to an alignment stored in the alignment storage means at which good fuel consumption can be achieved when the vehicle is in the straight traveling state. Thus, the rolling resistance of the wheels becomes minimum when the vehicle is in the straight traveling state, and the optimum fuel consumption can be obtained. Further, since alignment control at the time when the vehicle is in the non-straight traveling state (such as at the time when the vehicle is turning) will not be interfered, the traveling stability in the non-straight traveling state can be ensured.

Another aspect of the present invention is to provide an alignment changing control device for controlling an alignment of wheels of a vehicle, the alignment changing control device including: an alignment setting means for setting the alignment of the wheels in a traveling condition; a fuel consumption calculating means for calculating the fuel consumption in the traveling condition at the alignment set by the alignment setting means; a fuel consumption information storage means for correlating the alignment set by the alignment setting means with the fuel consumption calculated by the fuel consumption calculating means and storing them therein so that fuel consumption related information corresponding to each of different alignments is stored; and a selecting means which reads out the fuel consumption related information from the fuel consumption information storage means and selects an alignment at which the best fuel consumption can be achieved, in which the alignment setting means sets the wheels to the alignment selected by the selecting means.

With such a configuration, an alignment at which good fuel consumption can actually (as opposed to theoretically) be achieved is determined during travel. Thus, regardless of the traveling condition of the vehicle, the driver can empirically find an optimum alignment for himself in accordance with the traveling state of the vehicle.

Still another aspect of the present invention is to provide a fuel consumption management device of a vehicle equipped with an alignment changing control device for controlling the change of an alignment of wheels, the fuel consumption management device including: a storage means for storing route section related information where the route section is formed by dividing a traveling route into a plurality of route sections; a traveling position detecting means for detecting a traveling position of the vehicle; a route section detecting means which detects whether or not the traveling position detected by the traveling position detecting means is located in the route sections stored in the storage; an alignment changing means which changes the alignment every time the route section is changed based on the detection result of the route section detecting means; a fuel consumption calculating means which calculates the fuel consumption for each of the route sections; and a fuel consumption information registration means which stores the calculated fuel consumption and the set alignment in association with each other in the storage means.

With such a configuration, since the fuel consumption is calculated for each of the route sections, the fuel consumption of each of the alignments can be known for each of the route sections.

DETAILED DESCRIPTION OF PREFERRED EMBODIMENT(S)

Preferred embodiments of a toe angle changing control device for controlling the toe angle of the vehicle wheels will be described below with reference to the attached drawings.

The toe angle changing control device is an example of an alignment changing control device of the present invention, and the toe angle of the vehicle wheels is an example of the alignment of the vehicle wheels.

1. First Embodiment

Figure 1:
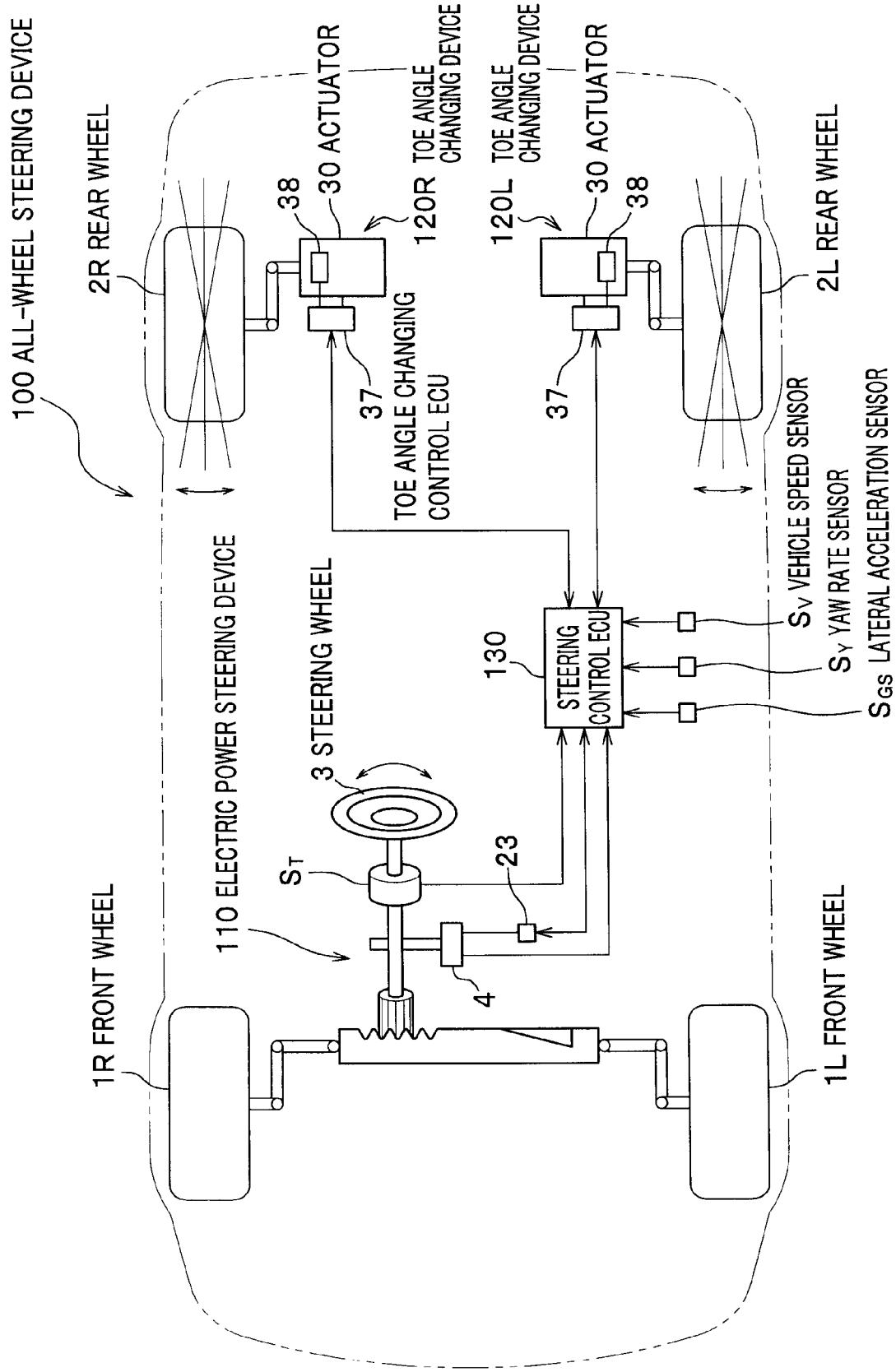
FIG. 1 is a schematic illustration briefly showing an all-wheel steering device of a four-wheel vehicle equipped with a toe angle changing control device according to a first embodiment of the present invention.
Figure 2:
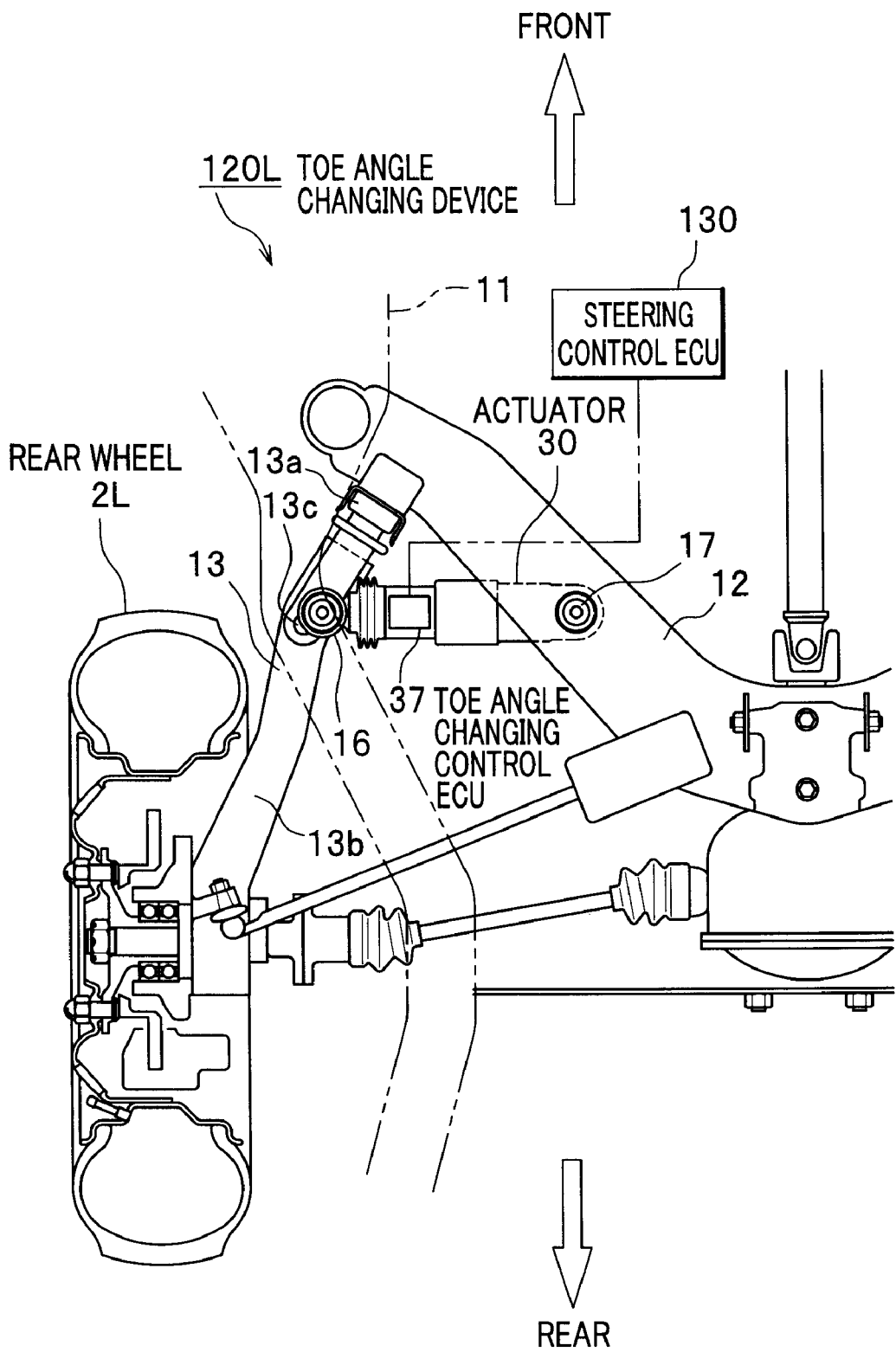
FIG. 2 is a plan view showing a toe angle changing device provided on a left rear wheel side according to the first embodiment.
Figure 3:
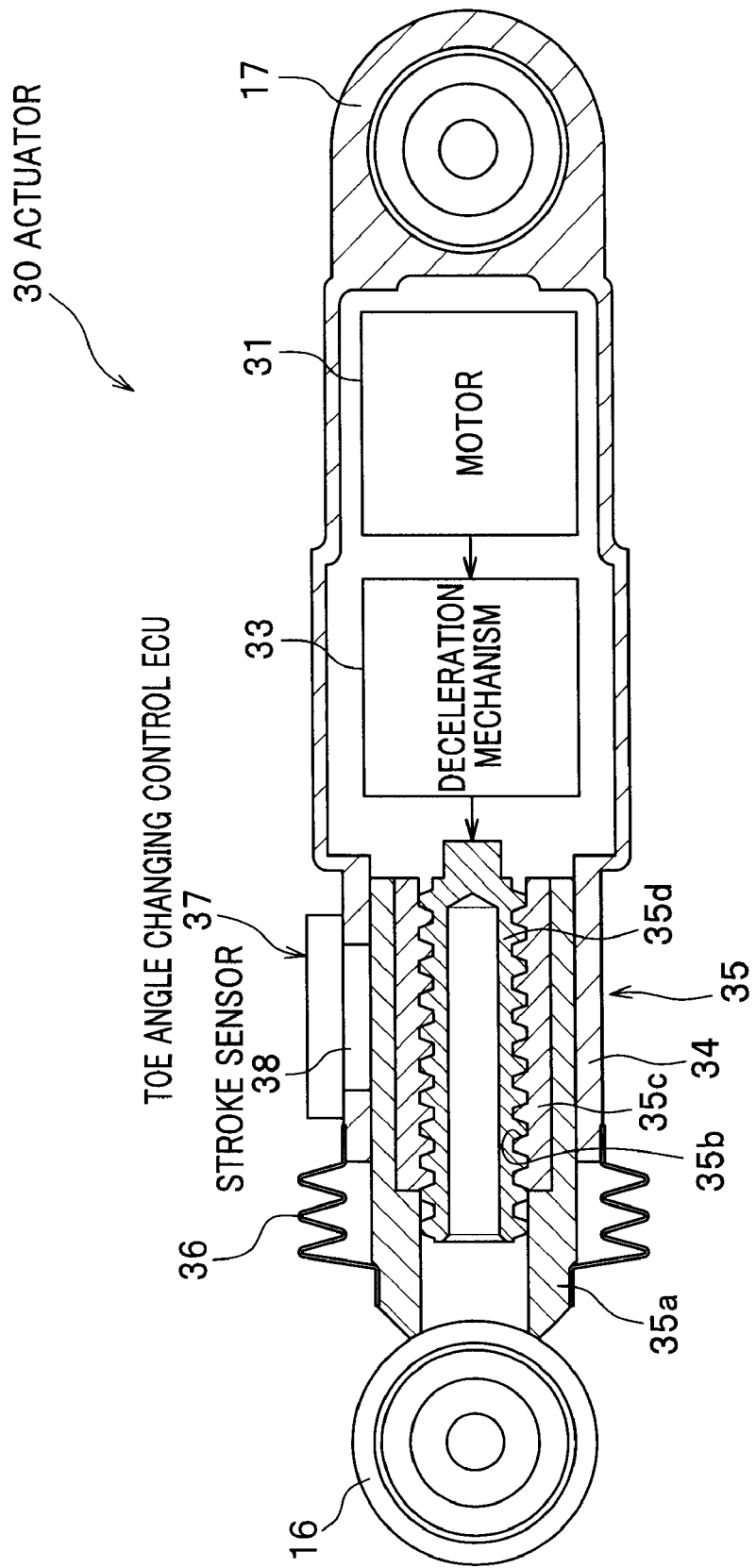
FIG. 3 is a brief cross section showing the construction of an actuator of the toe angle changing device according to the first embodiment.

A toe angle changing control device according to a first embodiment will be described below. The first embodiment relates to a technique for setting the toe angle of vehicle wheels to a theoretically optimum toe angle to improve the fuel consumption, when the vehicle is in a straight traveling state. The details will be described below. Incidentally, FIG. 1 is a schematic illustration briefly showing an all-wheel steering device of a four-wheel vehicle equipped with the toe angle changing control device; FIG. 2 is a plan view showing a toe angle changing device on a left rear wheel side; and FIG. 3 is a brief cross section showing the construction of an actuator of the toe angle changing device.

As shown in FIG. 1, an all-wheel steering device 100 includes an electric power steering device 110 for assisting the steering operation of a steering wheel 3 that steers front wheels 1L, 1R; toe angle changing devices 120L, 120R for independently steering each left and right rear wheels 2L, 2R in accordance with a turning angle of the front wheels 1L, 1R and the vehicle speed; a steering control 130 (referred to as "steering control ECU" hereinafter) for controlling the electric power steering device 110 and the toe angle changing devices 120L, 120R; and various sensors such as vehicle speed sensor $S_V$, yaw rate sensor $S_y$, and lateral acceleration sensor $S_{GS}$.

In the electric power steering device 110, a pinion shaft and a main steering shaft are connected with each other by two universal joints. A pinion gear arranged at the lower end of pinion shaft is meshed with rack teeth of a rack shaft capable of reciprocating in the vehicle width direction. The left and right front wheels 1L, 1R are respectively connected to both ends of the rack shaft through tie-rods. With such an arrangement, the electric power steering device 110 can change the traveling direction of the vehicle while the steering wheel 3 is being turned. Herein, the rack shaft, the rack teeth and the tie-rods constitute a steering mechanism. Incidentally, the upper portion, intermediate portion, and lower portion of the pinion shaft are supported by a steering gear box through a bearing.

The electric power steering device 110 includes a motor 4 for providing an assisting steering force in order to reduce the steering force of the steering wheel 3. A worm gear provided on the output shaft of the motor 4 meshes with a worm wheel gear provided on the pinion shaft. In other words, the worm gear and the worm wheel gear constitute a deceleration mechanism. Further, a rotor of the motor 4, the worm gear connected to the motor 4, the worm wheel gear, the pinion shaft, the rack shaft, the rack teeth, and the tie-rods constitute a steering system.

The motor 4 is a three phase brushless motor for converting electrical energy to mechanical energy. The motor 4 includes a stator (not shown) having a plurality of magnetic field coils and the rotor (not shown) rotating within the stator.

Herein, a steering torque Ts applied to the steering wheel 3 can be obtained from the following equation.

$$Ts = J \cdot d^2\theta_S/dt^2 + C \cdot d\theta_S/dt + K(\theta_S - \theta_F)$$

Where $\theta_S$ represents a rotation angle of the steering wheel, and $\theta_F$ represents a value obtained by dividing the rotation angle of the motor by the rotation ratio of the deceleration mechanism. Further, J represents an inertia coefficient of the steering system, C represents a viscosity (damper) coefficient, and K represents a base signal coefficient. The above equation is independent of the vehicle characteristic and the vehicle state.

Further, the electric power steering device 110 includes a steering torque sensor $S_T$ for detecting the steering torque Ts, a motor drive circuit 23 for driving the motor 4, a resolver for detecting the rotation angle of the motor 4, a pinion torque sensor for detecting the pinion torque applied to the pinion shaft, a differential amplification circuit for amplifying the output of the pinion torque sensor, and a vehicle speed sensor $S_V$.

The vehicle speed sensor $S_V$ detects the vehicle speed V and outputs a vehicle speed signal. The vehicle speed sensor $S_V$ detects the vehicle speed V by detecting the number of pulses per unit time.

The steering control ECU will be described below. The steering control ECU 130 includes a computer, a program, peripheral circuits and the like. The computer includes a CPU (Central Processing Unit), a ROM (Read Only Memory), a RAM (Random Access Memory) and the like. The traveling condition of the vehicle, namely the lateral acceleration, the yaw rate and the vehicle speed are respectively detected by the lateral acceleration sensor $S_{GS}$, the yaw rate sensor $S_Y$ and the vehicle speed sensor $S_V$, and the detected results are output to the steering control ECU 130. According to the results detected by the lateral acceleration sensor $S_{GS}$, the yaw rate sensor $S_Y$ and the vehicle speed sensor $S_V$, the steering control ECU 130 outputs a control signal for controlling the toe angle changing devices 120L, 120R, which control the electric power steering device 110 and the toe angle of the rear wheel 2L, 2R.

The construction of the toe angle changing device will be described below with reference to FIGS. 2 and 3.

FIG. 2 is a plan view showing the toe angle changing device on a left rear wheel side, and FIG. 3 is a brief cross section showing the construction of an actuator of the toe angle changing device.

The toe angle changing devices 120L, 120R are respectively attached on the left and right rear wheels 2L, 2R of the vehicle. FIG. 3 shows the toe angle changing device 120L as an example. The toe angle changing devices 120L, 120R each include an actuator 30, and a toe angle changing control device 37 (referred to as "toe angle changing control ECU" hereinafter). Although FIG. 2 only shows the toe angle changing device attached on the left rear wheel 2L, it should be understood that the toe angle changing device is also attached on the right rear wheel 2R in a symmetrical manner. Incidentally, the toe angle changing control ECU 37 corresponds to the toe angle changing control device of the present invention.

A vehicle-width-direction-end-portion of a cross member 12 substantially extending in the vehicle width direction is elastically supported on a rear side frame 11 of the vehicle body. A front end of a trailing arm 13 substantially extending in the vehicle longitudinal direction is supported in the vicinity of the vehicle-width-direction-end-portion of a cross member 12. The rear wheels 2L, 2R are fixed to the rear end of the trailing arm 13.

In the trailing arm 13, a body side arm 13a mounted on the cross member 12 and a wheel side arm 13b fixed to each of the rear wheels 2L, 2R are connected with each other through a rotary shaft 13c substantially extending in the vertical direction. With such an arrangement, the trailing arm 13 can be displaced in the vehicle width direction.

The actuator 30 has one end thereof attached to a front end portion of the wheel side arm 13b through a ball joint 16, and has the other end thereof attached to the cross member 12 through a ball joint 17, the position of the front end portion of the wheel side arm 13b being closer to the vehicle front side than the rotary shaft 13c.

As shown in FIG. 3, the actuator 30 includes a motor 31, a deceleration mechanism 33, a feed screw portion 35 and the like.

The motor 31 may be a brush motor, a brushless motor or the like rotatable in the positive and reverse directions.

The deceleration mechanism 33 is formed by combining two sets of planetary gears (not shown) or the like.

The feed screw portion 35 includes a cylindrical rod 35a, a nut 35c formed with a screw groove 35b, and a screw shaft 35d engaging with the screw groove 35b, the nut 35c being inserted into the rod 35a, the screw shaft 35d movably supporting the rod 35a in the shaft direction. The screw shaft 35d, the deceleration mechanism 33 and the motor 31 are housed in a case 34 having a long and narrow shape. The deceleration mechanism 33 has one end thereof connected with the output shaft of the motor 31 and the other end thereof connected with the screw shaft 35d.

The power of the motor 31 is transmitted to the screw shaft 35d through the deceleration mechanism 33 so that the screw shaft 35d rotates, and thereby the rod 35a moves in the left and right direction of FIG. 3 (i.e., in the shaft direction) relative to the case 34. Further, a boot 36 is attached to the actuator 30 to prevent the ingress of foreign substance such as dust and water.

Further, a stroke sensor 38 for detecting the position of the rod 35a (i.e., the movement amount of the rod 35a) is attached to the actuator 30. For example, the stroke sensor 38 may have such a configuration in which the position of the rod 35a is detected using the magnetism of a built-in magnet. By detecting the position of the rod 35a with the stroke sensor 38, the toe angle (toe-in or toe-out) of the rear wheels 2L, 2R can be accurately and individually detected.

In the actuator 30, the ball joint 16 arranged at the tip end of the rod 35a is rotatably connected to the wheel side arm 13b of the trailing arm 13 (see FIG. 2), and the ball joint 17 arranged at the base end of the case 34 is rotatably connected to the cross member 12 (see FIG. 2). The screw shaft 35d rotates, being driven by the motor 31, so that the rod 35a extends or contracts. When the rod 35a extends (to the left side of FIG. 3), the wheel side arm 13b is pushed toward the outside of the vehicle in the vehicle width direction (i.e., toward the left side of FIG. 2) so that the left rear wheel 2L is turned to the left; and when the rod 35a contracts (to the right side of FIG. 3), the wheel side arm 13b is pulled toward the inside of the vehicle in the vehicle width direction (i.e., toward the right side of FIG. 2) so that the left rear wheel 2L is turned to the right.

It should be note that the ball joint 16 of the actuator 30 does not have to be attached to the wheel side arm 13b, but can be attached to other position as long as the toe angle of the left rear wheel 2L can be changed. For example, the ball joint 16 also can be attached to the knuckle. Further, although the toe angle changing devices 120L, 120R is described using an example where the toe angle changing devices 120L, 120R are applied to a semi-trailing arm type independent suspension, the angle changing devices 120L, 120R do not have to be limited thereto, but can be applied to other types of suspensions.

Further, the toe angle changing control ECU 37 is integrated with the actuator 30. The toe angle changing control ECU 37 is fixed to the case 34 of the actuator 30. Specifically, the toe angle changing control ECU 37 is connected to the case 34 through the stroke sensor 38 and a connector.

The toe angle changing control ECU 37 is powered by a power source such as a battery (not shown) mounted on the vehicle. Further, the steering control ECU 130 and the motor drive circuit 23 are also powered by a power source such as a battery (not shown) in a system separated from the above power source.

The construction of the toe angle changing control ECU will be described below with reference to FIG. 4.

Figure 4:
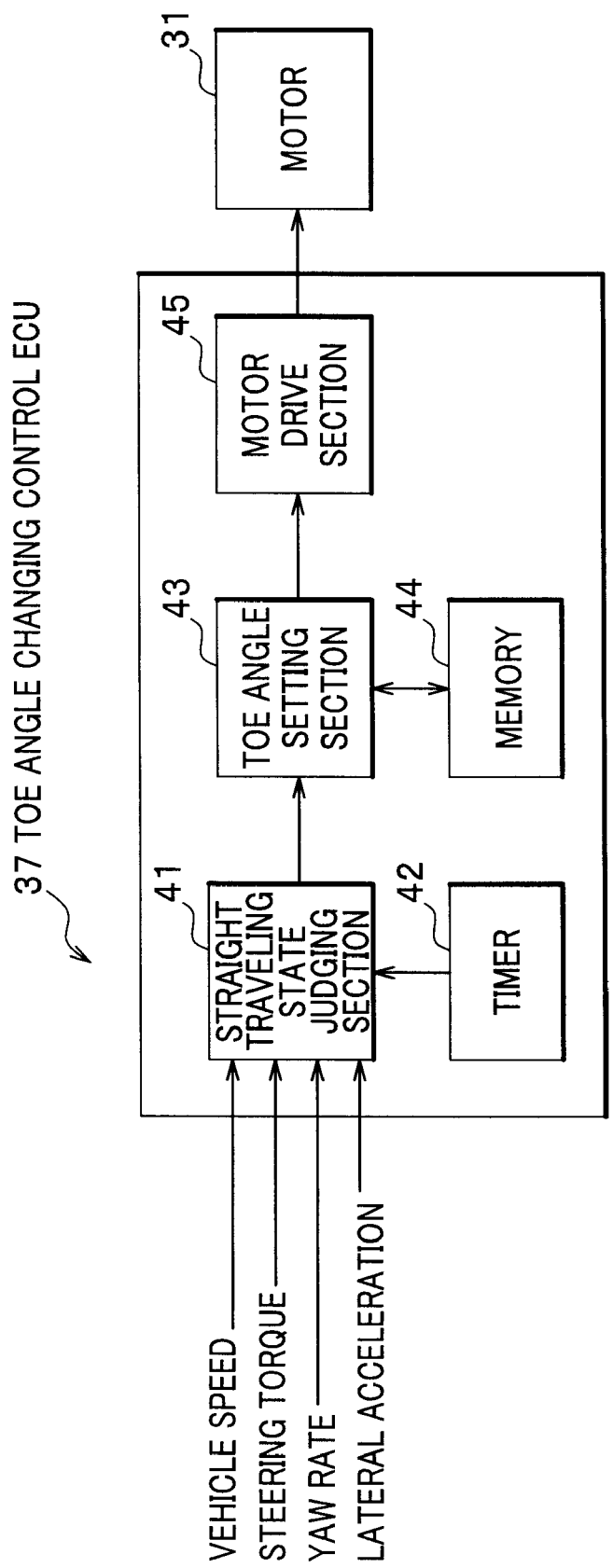
FIG. 4 is a block diagram showing a toe angle changing control ECU according to the first embodiment.

As shown in FIG. 4, the toe angle changing control ECU 37 has a function to drive-control the actuator, and such a function is executed through a computer having a CPU, a RAM, a ROM and the like. A program for executing the processing routine corresponding to such a function is stored in the ROM. Further, each of the toe angle changing control ECUs 37 is connected to respective steering control ECU 130 through a communication wire, and two toe angle changing control ECUs 37 are also connected with each other through a communication wire.

The toe angle changing control ECU 37 includes a straight traveling state judging section 41, a timer 42, a toe angle setting section 43, a memory 44 and a motor drive section 45. In the straight traveling state judging section 41, the detected results of the traveling condition of the vehicle, specifically the signals of the vehicle speed, the steering torque, the yaw rate, and the lateral acceleration, are input by the steering control ECU 130 to judge whether or not the vehicle is in the straight traveling state. When the vehicle travels straight, the steering torque, the yaw rate, and the lateral acceleration are almost zero, however if such a state does not continue for a predetermined time period, it can not be judged that the vehicle is in the straight traveling state. For example, when the steering wheel 3 is firstly turned to the right and then to the left, there is a short moment when the steering torque equals zero, yet it is not judged that the vehicle is in the straight traveling state. For this reason, the straight traveling state judging section 41 detects time information with the timer 42 to judge whether or not the state where the steering torque is zero continues for a predetermined time period. Incidentally, the straight traveling state also can be judged by considering all of the vehicle speed, the steering torque, the yaw rate and the lateral acceleration.

When a control signal, which means the straight traveling state judging section 41 has judged that the vehicle is in the straight traveling state, is output, the toe angle setting section 43 reads out the optimum toe angle stored in the memory 44. The toe angle stored in the memory 44 is set such that when the vehicle is in the straight traveling state, the vehicle wheel is substantially parallel to the longitudinal direction of the vehicle. Namely, when the vehicle is in the straight traveling state, the toe angle is set to substantially 0°, at which the rolling resistance of the wheels becomes minimum theoretically. It is preferred that such a toe angle be stored in the memory 44 of a new vehicle shipped from an auto manufacturer, or be stored in the memory 44 when performing maintenance to a newly purchased or newly repaired vehicle.

The toe angle setting section 43 outputs a motor control signal to the motor drive section 45 to set the wheels to the toe angle stored in the memory 44. The motor control signal includes a current value of the current supplying to the motor 31 and a current direction in which the current flows. The motor drive section 45 includes a FET (Field Effect Transistor) bridge circuit. The motor drive section 45 applies a motor voltage to the motor 31 based on the motor control signal.

Figure 5:
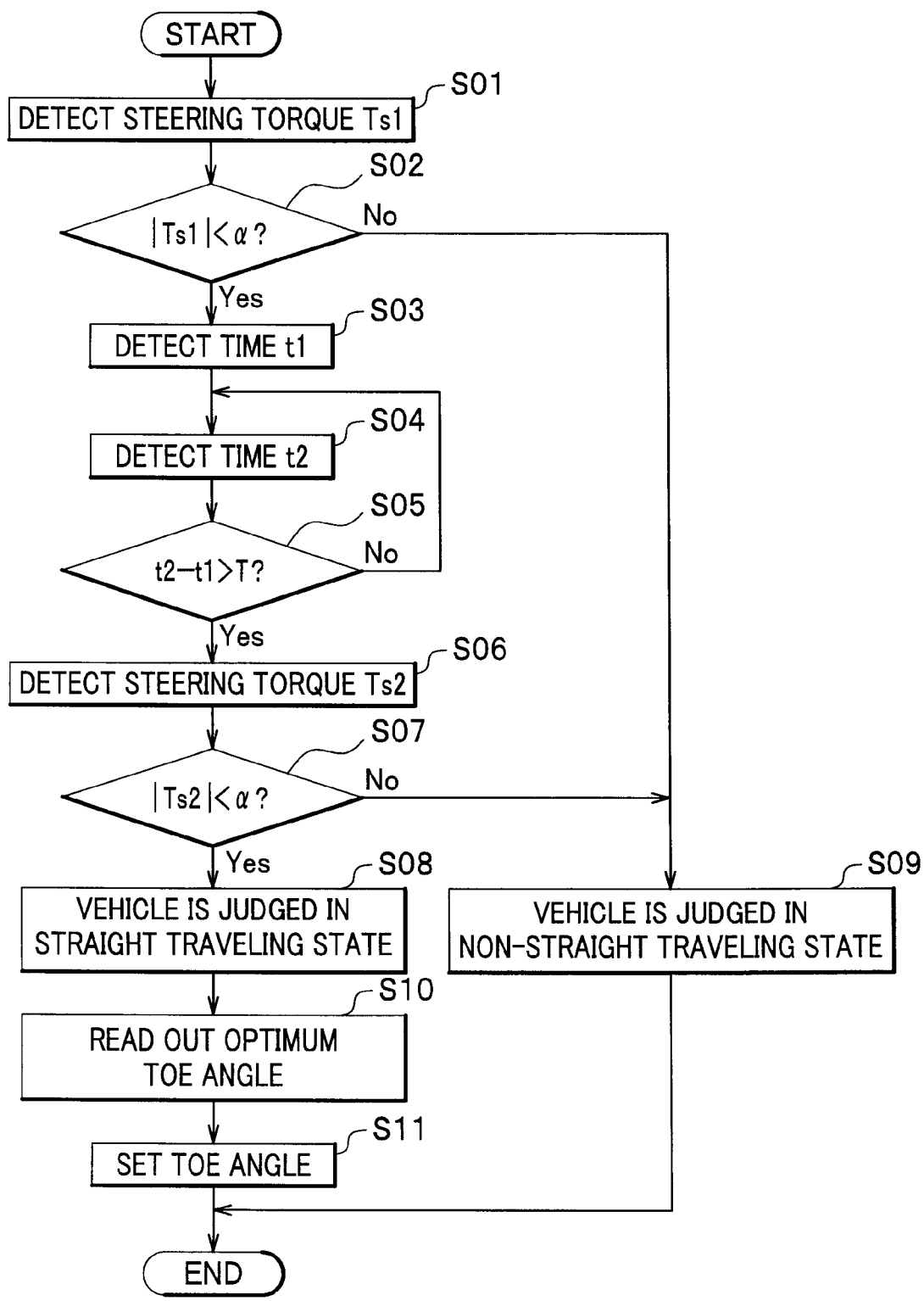
FIG. 5 is a flowchart explaining a process for setting the wheels to an optimum toe angle with the toe angle changing control ECU according to the first embodiment.

A process for setting the optimum toe angle with the toe angle changing control ECU will be described below with reference to the flowchart of FIG. 5. As shown in FIG. 5, the straight traveling state of the vehicle is judged by using a steering torque Ts. The straight traveling state can be most precisely judged by detecting the turning of the steering wheel 3 because the detected result is reflected by the steering torque Ts. Further, the process is performed only during travel. Namely, the process will not be performed when the vehicle is stopped and the vehicle speed is zero. However, in the initial state, the rear wheels 2L, 2R should be set to slightly toe-in to emphasize the traveling stability.

First, a steering torque Ts1 is detected during travel, and a respective steering torque signal is input to the straight traveling state judging section 41 from the steering control ECU 130 (step S01). Next, it is judged whether or not the absolute value of the steering torque Ts1 of the input signal is smaller than a small quantity α (Step S02). The value of the small quantity α can be properly set at the time when adjusting the accuracy level for judging the straight traveling state. If the absolute value of the steering torque Ts1 is smaller than the small quantity α (i.e., if it is determined "Yes" in Step S02), then the time t1 when the steering torque Ts1 is detected is detected by the timer 42 (Step S03). If the absolute value of the steering torque Ts1 is not smaller than the small quantity α (i.e., if it is determined "No" in Step S02), then it is judged that the vehicle is in the non-straight traveling state (Step S09). Thus, the process ends without setting the toe angle to the value at which the wheels are substantially parallel to the longitudinal direction of the vehicle. Note that the detection of the steering torque Ts will be repeatedly performed at a predetermined interval during travel, therefore the process shown in FIG. 5 will be repeatedly executed.

When a time period elapses after the time t1 is detected, a time t2 is detected by the timer 42 (Step S04). Then a time difference t2−t1 between the time t2 and the time t1 is calculated (Step S05). If the time difference t2−t1 is larger than a predetermined time period T (i.e., if it is determined "Yes" in Step S05), then a steering torque Ts2 is detected, and a respective steering torque signal is input to the straight traveling state judging section 41 from the steering control ECU 130 (Step S06). The predetermined time period T serves as a reference for judging whether or not the state where the steering torque is substantially zero continues. The predetermined time period T can be properly set at the time when adjusting the accuracy level for judging the straight traveling state. If the time difference t2−t1 is smaller than the predetermined time period T (i.e., if it is determined "No" in Step S05), then the process returns to Step S04 to detect the time t2 again. Thus, the steering torque Ts2 will not be detected until the predetermined time period T has elapsed.

Next, it is judged whether or not the absolute value of the detected steering torque Ts2 is smaller than a small quantity α (Step S07). The small quantity α of the Step S07 has the same function as that of Step S02, but they do not have to be set to the same value. If the absolute value of the steering torque Ts2 is smaller than the small quantity α (i.e., if it is determined "Yes" in Step S07), then it is judged that the vehicle is in the straight traveling state (Step S08). During the predetermined time period T, the state where the steering torque substantially equals to zero continues, which means that the steering wheel 3 has almost not been turned. Thus, it is judged that the vehicle is in the straight traveling state, and the control signal representing such a judgment is output to the toe angle setting section 43.

If the absolute value of the steering torque Ts2 is not smaller than the small quantity α (i.e., if it is determined "No" in Step S07), then it is judged that the vehicle is in the non-straight traveling state (Step S09). Thus, the process ends without setting the toe angle to the value at which the wheels are substantially parallel to the longitudinal direction of the vehicle.

After it has been judged that the vehicle is in the straight traveling state, the optimum toe angle is read out from the memory 44 by the toe angle setting section 43 (Step S10). Next, the motor control signal is output to the motor drive section 45 to drive the motor 31, and thereby the rear wheels 2L, 2R are set to a target toe angle, at which the rear wheels 2L, 2R are substantially parallel to the longitudinal direction of the vehicle (Step S11), and the process ends.

Incidentally, for putting emphasis on the traveling stability, when the state of the vehicle is changed from the straight traveling state to the non-straight traveling state, for example when the vehicle is turning, the wheels 2L, 2R should be returned to the optimum toe-in state or toe-out state suitable to the time when the vehicle is turning. For serving this purpose, when it is detected that the absolute value of the steering torque Ts is not smaller that the small quantity $\alpha$, the wheels are set to the toe-in state or toe-out state.

According to the first embodiment, the following advantages can be achieved. When the vehicle is in the straight traveling state, the rear wheels 2L, 2R are set to a toe angle, at which the rear wheels 2L, 2R are substantially parallel to the longitudinal direction of the vehicle. Thus, when the vehicle travels straight, the rolling resistance of the rear wheels 2L, 2R is theoretically minimized, therefore the fuel consumption can be improved. However, when the vehicle is in the non-straight traveling state such as at the time when the vehicle is turning, the wheels are not set to such a toe angle. Thus, since the toe angle control at the time when the vehicle is in the non-straight traveling state (such as at the time when the vehicle is turning) will not be interfered with, the traveling stability in the non-straight traveling state can be ensured.

2. Second Embodiment

Figure 6:
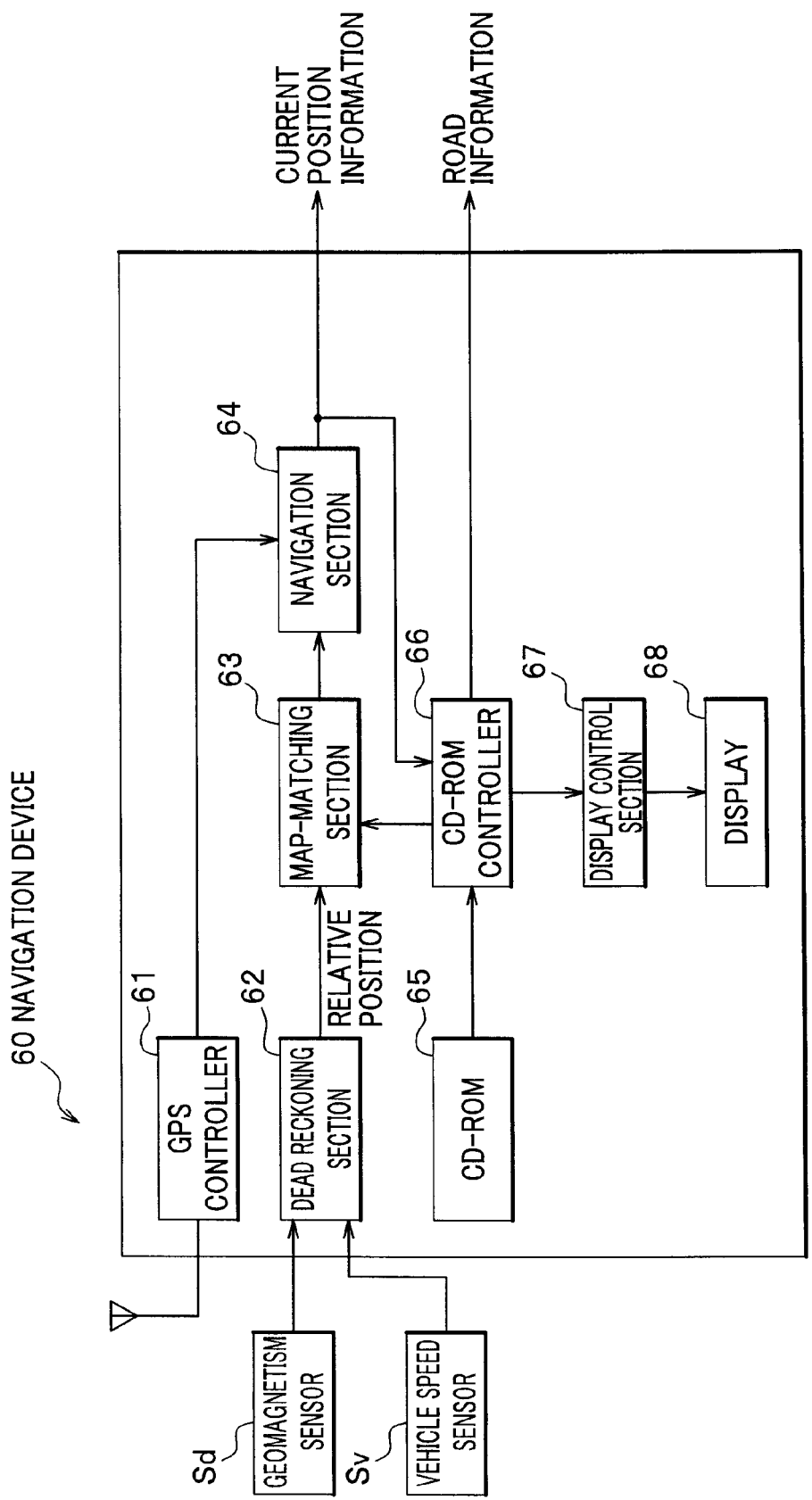
FIG. 6 is a block diagram showing a navigation device according to a second embodiment.
Figure 7:
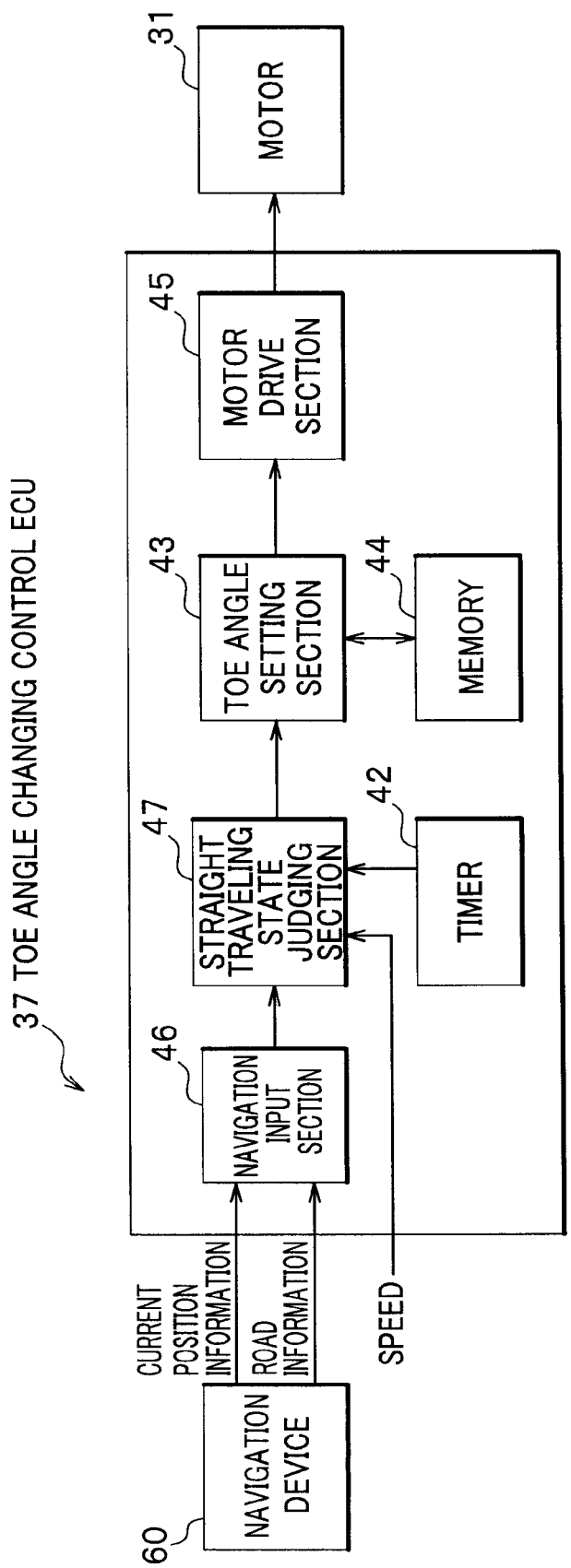
FIG. 7 is a block diagram showing a toe angle changing control ECU according to the second embodiment.

According to a second embodiment, in a vehicle equipped with a navigation device, whether or not the vehicle during travel is in the straight traveling state is estimated based on the information from the navigation device during travel, and the optimum toe angle is set based on such an estimation. The details thereof will be described below. FIG. 6 is a block diagram showing the navigation device, and FIG. 7 is a block diagram showing a toe angle changing control ECU connected to the navigation device through a communication wire.

The construction of the navigation device will be described below with reference to FIG. 6. The basic portion of the construction has already been disclosed in Japanese Patent Laid-Open Publication No. Hei11-51655.

In the second embodiment, the navigation device is denoted by reference numeral 60. The navigation device 60 includes a GPS (Global Positioning System) controller 61, a dead reckoning section 62, a map-matching section 63, a navigation section 64, a CD-ROM (Compact Disk-Read Only Memory) 65, a CD-ROM controller 66, a display control section 67, and a display 68.

The CD-ROM 65 serves as a map information storage section for storing map information which includes electronic road information. The route maps stored in the CD-ROM 65 includes a very large number of meshes which constitute a whole national map. The route information of each mesh represents the road within the mesh, the attribute of the road, etc. Each road includes a plurality of nodes which show the shape of the road, and the section between two adjacent nodes represents a road section. A road section is specified as a link ID (Identification). In other words, by specifying one node and one link ID whose one end is the specified node, the other end of the specified link ID can be specified.

The road information includes information such as coordinates of each node. If the node is a bifurcation node or intersection node, the information representing roads connected to the node will be included as the data structure of the link ID. The attribute of the road includes the name of the road, the width of the road and other attributes such as whether or not the road is straight, curved, sloped and the like.

In the traveling direction of the vehicle, since there is one or more road sections connected to the current node corresponding to current vehicle position, there is one or more link IDs specified. If the current node is not a bifurcation node (which represents a bifurcation) or an intersection node (which represents an intersection), there is only one road section connected to the current node and therefore there is only one link ID specified. On the other hand, if the current node is a bifurcation node or an intersection node, there are two or more course sections connected to the current node, and the link IDs corresponding to the respective course sections are specified.

The GPS controller 61 inputs a signal from a satellite navigation system (GPS) through an antenna and outputs information representing the absolute position of the vehicle to the navigation section 64. The dead reckoning section 62 outputs information representing the relative position and the travel locus of the vehicle to the map-matching section 63 based on the azimuth detected by the geomagnetism sensor Sd and the vehicle speed detected by the vehicle speed sensor Sv.

In the map-matching section 63, the road on which the vehicle is currently traveling is specified based on the road information included in the map information output from the CD-ROM 65 through the CD-ROM controller 66 and based on the travel locus of the vehicle obtained from the dead reckoning section 62. In the navigation section 64, the current position of the vehicle is precisely obtained based on the absolute position input by the GPS controller 61 and the relative position input by the map-matching section 63, and the current position information is output.

The display control section 67 displays a road map showing the periphery of the traveling road on the display 68 based on the road information output by the CD-ROM 65 through the CD-ROM controller 66 and the current position information output by the navigation section 64 through the CD-ROM controller 66. If destination information is input by the driver, a recommended route from the current position to the destination will also be displayed on the display 68.

The construction of the toe angle changing control ECU connected to the navigation device through a communication wire will be described below with reference to FIG. 7. The toe angle changing control ECU 37 includes a navigation input section 46, a straight traveling state estimating section 47, a timer 42, a toe angle setting section 43, a memory 44 and a motor drive section 45. Since the toe angle changing control ECU has the same basic function as that of the first embodiment, the part identical to the first embodiment will not be described here again.

The navigation input section 46 is an interface connected to the navigation device 60 through a communication wire. The current position information and road information obtained by the navigation device 60 are output to the straight traveling state estimating section 47. According to the current position information, the navigation input section 46 sequentially inputs the road information relevant to the current position, the information including the information of the nodes and the information of the link IDs whose ends are the nodes. The input road information does not only include information of the current node relevant to the current position, but also includes the road information within a mesh covering a predetermined area with the current node as the center, the information of the nodes within the mesh, and the information of the link IDs whose ends are these nodes.

The straight traveling state estimating section 47 estimates whether or not the vehicle can travel straight after a predetermined time has elapsed from the current position. Based on the current position information and road information input from the navigation input section 46, the current node and the link ID whose one end is the node are extracted. The other end of the extracted link ID is specified as the position of the vehicle after the predetermined time has elapsed. Herein the other end of the extracted link ID means the end other than the one end (namely, the current node) of the extracted link ID. The road state of the specified position is read out from the road information, and if the road allows the vehicle to travel straight, then the state is estimated to be the straight traveling state.

In the toe angle setting section 43, when a control signal, which means the straight traveling state estimating section 47 has estimated that the vehicle is in the straight traveling state, is input, the optimum toe angle stored in the memory 44 is read out, and the wheels are set to the optimum toe angle.

Figure 8:
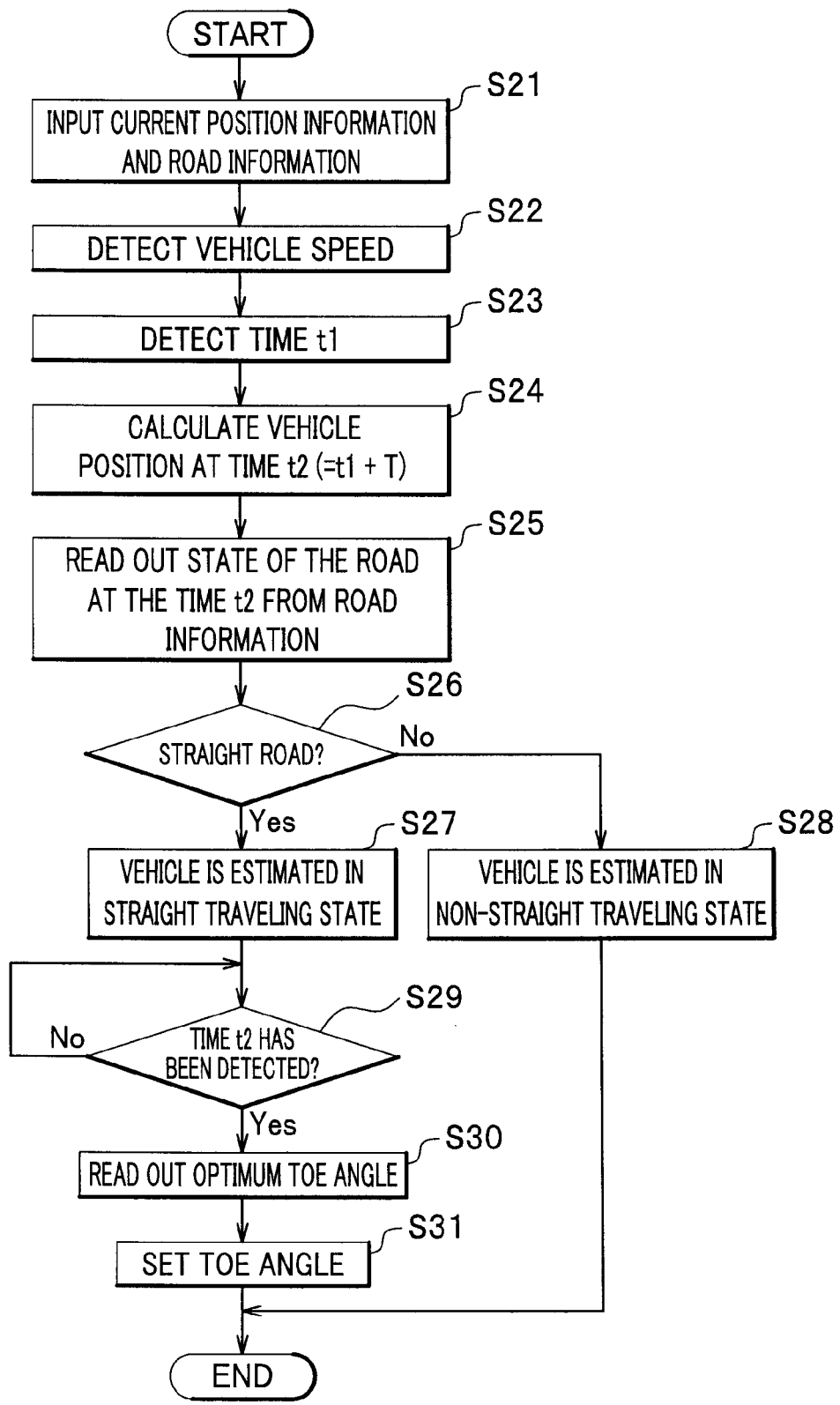
FIG. 8 is a flowchart explaining a process for setting the wheels to an optimum toe angle with the toe angle changing control ECU according to the second embodiment.

A process for setting the optimum toe angle with the toe angle changing control ECU will be described below with reference to the flowchart of FIG. 8. The process is performed only during travel. Namely, the process will not be performed when the vehicle is stopped and the vehicle speed is zero.

First, the current position information and the road information are input from the navigation input section 46 to the straight traveling state estimating section 47 during travel (Step S21). Next, the vehicle speed is detected, and a signal representing the vehicle speed at the current position is input (Step S22). Next, in order to estimate whether or not the vehicle travels straight when a predetermined time period T has elapsed from the current position, a time t1 when the vehicle is at the current position is detected by the timer 42 (Step S23). The predetermined time period T serves as a reference for estimating whether or not the vehicle travels straight after the vehicle has traveled for a distance calculated by multiplying the vehicle speed by T. The predetermined time period T can be properly set at the time when adjusting the accuracy level for estimating the straight traveling state.

The vehicle position is calculated (Step S24) at a time t2 when the predetermined time period T has elapsed from the time t1. Specifically, when assuming that the distance calculated by multiplying the vehicle speed by T is a traveling distance of the vehicle, the position previously estimated to be reached by the vehicle can be specified based on the traveling distance, the current node of the current position of the vehicle, the link ID whose one end is the current node, and the node that represents the other end of the specified link ID. Incidentally, the traveling distance also can be calculated based on not only the vehicle speed, but also the steering torque, the yaw rate, and the lateral acceleration.

Next, the state of the road previously estimated to be traveled at the time t2 is read out from the road information (Step S25). Specifically, the link ID used to previously estimate the position to be reached by the vehicle in Step 24 is used to read out the node that represents the end other than the one end (the current node) of the link ID, and read out the state of the road corresponding to the node. Then it is determined whether or not the road corresponding to the node is a straight road (Step S26).

If it is determined that the road corresponding to the node is a straight road (i.e., if it is determined "Yes" in Step S26), then it is estimated that the vehicle is in the straight traveling state (Step S27). If it is determined that the road corresponding to the node is not a straight road (i.e., if it is determined "No" in Step S26), then it is estimated that the vehicle is in the non-straight traveling state, which ends the process (Step S28). Note that the road information input from the navigation device 60 will be repeatedly read out at a predetermined interval during travel, therefore the process shown in FIG. 8 will be repeatedly executed.

When it is estimated that the vehicle will be in the straight traveling state, the time information is input by the timer 42 to determine whether or not the time t2 has been detected when the predetermined time period T has elapsed (Step S29). If the time t2 has been detected (i.e., if it is determined "Yes" in Step S29), then a control signal for setting the toe angle is input to the toe angle setting section 43, and in the toe angle setting section 43, the optimum toe angle is read out by the memory 44 (Step S30). Then, the motor control signal is output to the motor drive section 45 to drive the motor 31, and thereby the rear wheels 2L, 2R are set to a target toe angle, at which the rear wheels 2L, 2R are substantially parallel to the longitudinal direction of the vehicle (Step S31), and the process ends. If the time t2 is not detected (i.e., if it is determined "No" in Step S29), the steps from Step 31 will not be performed until the time t2 has been detected.

If the current node of the current position of the vehicle is not a bifurcation node or an intersection node, since the link ID and the node that represents the other end of the link ID can be uniquely specified, only the state of the road corresponding to the node needs to be estimated. While if the current node is a bifurcation node or an intersection node, there are a plurality of link IDs specified. In such a case, the traveling course can be estimated by using the method disclosed in Japanese Patent Laid-Open Publication No. Hei11-51655 for example, and then the link ID and the node that represents the other end of the link ID can be specified.

According to the second embodiment, the following advantages can be achieved. If it is estimated that the vehicle will be in the straight traveling state, then when the estimated time period has elapsed, the rear wheels 2L, 2R are set to a target toe angle, at which the rear wheels 2L, 2R are substantially parallel to the longitudinal direction of the vehicle. Thus, when the vehicle travels straight, the rolling resistance of the rear wheels 2L, 2R is theoretically minimized, therefore the fuel consumption can be improved. Further, since the straight traveling state is previously estimated, the toe angle can be set earlier than the case where the straight traveling state is actually judged, therefore the fuel consumption can be improved in a more efficient manner.

3. Third Embodiment

Figure 9:
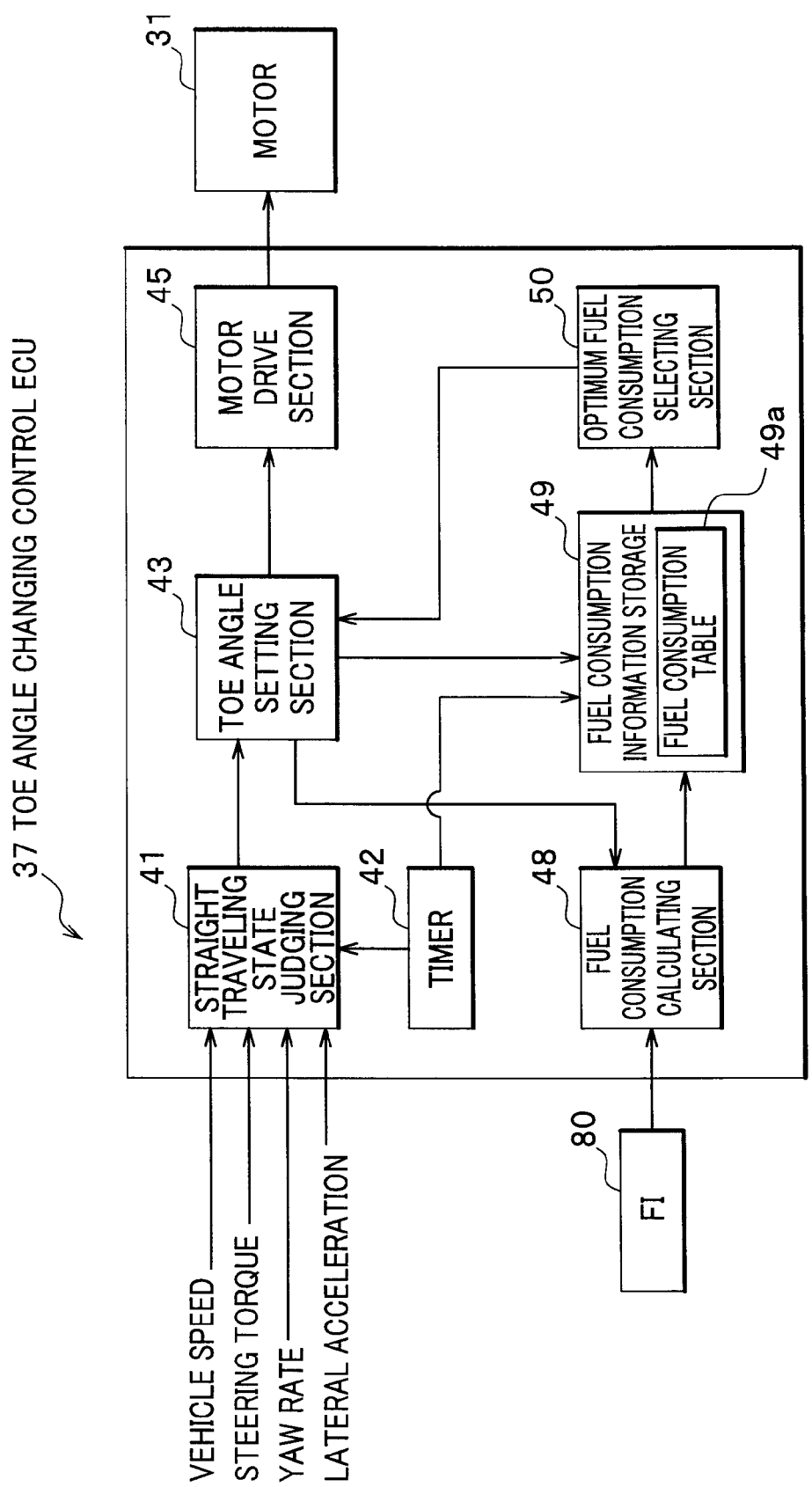
FIG. 9 is a block diagram showing a toe angle changing control ECU according to a third embodiment.

In a third embodiment, the toe angle which actually results in the best fuel consumption is determined by intentionally changing the toe angle of the rear wheels 2L, 2R to different values during travel and calculating the fuel consumption at these values. The details thereof will be described below. FIG. 9 is a block diagram showing a toe angle changing control ECU according to the fourth embodiment.

As shown in FIG. 9, the toe angle changing control ECU 37 includes a straight traveling state judging section 41, a timer 42, a toe angle setting section 43, a motor drive section 45, a fuel consumption calculating section 48, a fuel consumption information storage 49 having a fuel consumption table 49a, and an optimum fuel consumption selecting section 50. Since the toe angle changing control ECU has the same basic function as that of the first embodiment, the part identical to the first embodiment will not be described here again.

The fuel consumption calculating section 48 detects the quantity of the fuel injected by a Fuel Injection Device (referred to as FI hereinafter) and calculates an instantaneous fuel consumption. The fuel is injected by the FI inject in an electronic controlled manner. The fuel consumption is calculated at the time when a control signal is output by the toe angle setting section 43. When a control signal, which means the straight traveling state judging section 41 has judged that the vehicle is in the straight traveling state, is input, the toe angle setting section 43 reads out the fuel consumption information storage 49 and sets a trial toe angle at which the fuel consumption is to be measured. At this time, a motor control signal is output to the motor drive section 45, and on the other hand, a control signal is output to the fuel consumption calculating section 48 to calculate the fuel consumption.

The fuel consumption information storage 49 correlates the toe angle set by the toe angle setting section 43 with the fuel consumption calculated by the fuel consumption calculating section 48, and stores them therein as fuel consumption related information for each of the trial toe angles. By collecting the stored fuel consumption related information, a later-mentioned fuel consumption table 49a (see FIG. 10) is created. Incidentally, the trial toe angle can be properly set and changed, and it is preferred to select the angle near the toe angle which actually results in the best fuel consumption.

The optimum fuel consumption selecting section 50 reads out the fuel consumption table 49a of the fuel consumption information storage 49, searches for a best fuel consumption from the fuel consumptions stored in the fuel consumption table 49a, and extracts a toe angle corresponding to the best fuel consumption. A control signal corresponding to the extracted toe angle is output to the toe angle setting section 43. The toe angle setting section 43 outputs a motor control signal to the motor drive section 45 to set the wheels to the toe angle selected by the optimum fuel consumption selecting section 50.

Figure 10:
FIG. 10 shows the structure of a fuel consumption table according to the third embodiment, in which fuel consumption related information is stored.

The structure of the fuel consumption related information stored in the fuel consumption table 49a will be described below with reference to FIG. 10. The table includes sequentially numbered rows. The sequential number indicates the order in which the fuel consumption is measured. Further, the items of the column of the table include "number" which indicates the order in which the fuel consumption is measured, "toe angle" which represents the trial toe angle at which the fuel consumption is to be measured, "fuel consumption" which represents the fuel consumption measured at the corresponding trial toe angle, "start time" which represents the time at which the measurement of the fuel consumption is started, and "end time" which represents the time at which the measurement of the fuel consumption is ended. For example, the fuel consumption related information of the number "1" can be described as: the wheels are set by the toe angle setting section 43 to 0.1° toe-in (note that, hereinafter, a positive sign "+" before the toe angle means that the wheels are set to toe-in), and the fuel consumption is measured for three minutes from Jan. 19, 2007 8:00:00 to Jan. 19, 2007 8:03:00. The start time and the end time are determined by the time information input by the timer 42. The fuel consumption calculating section 48 then calculates the fuel consumption of this time period, and the calculated fuel consumption is 15.0 (km/l) in this case.

By repeating the same measuring sequence for number "2", "3", •••, the sample data of the fuel consumption corresponding to each of the trial toe angles is collected.

Figure 11:
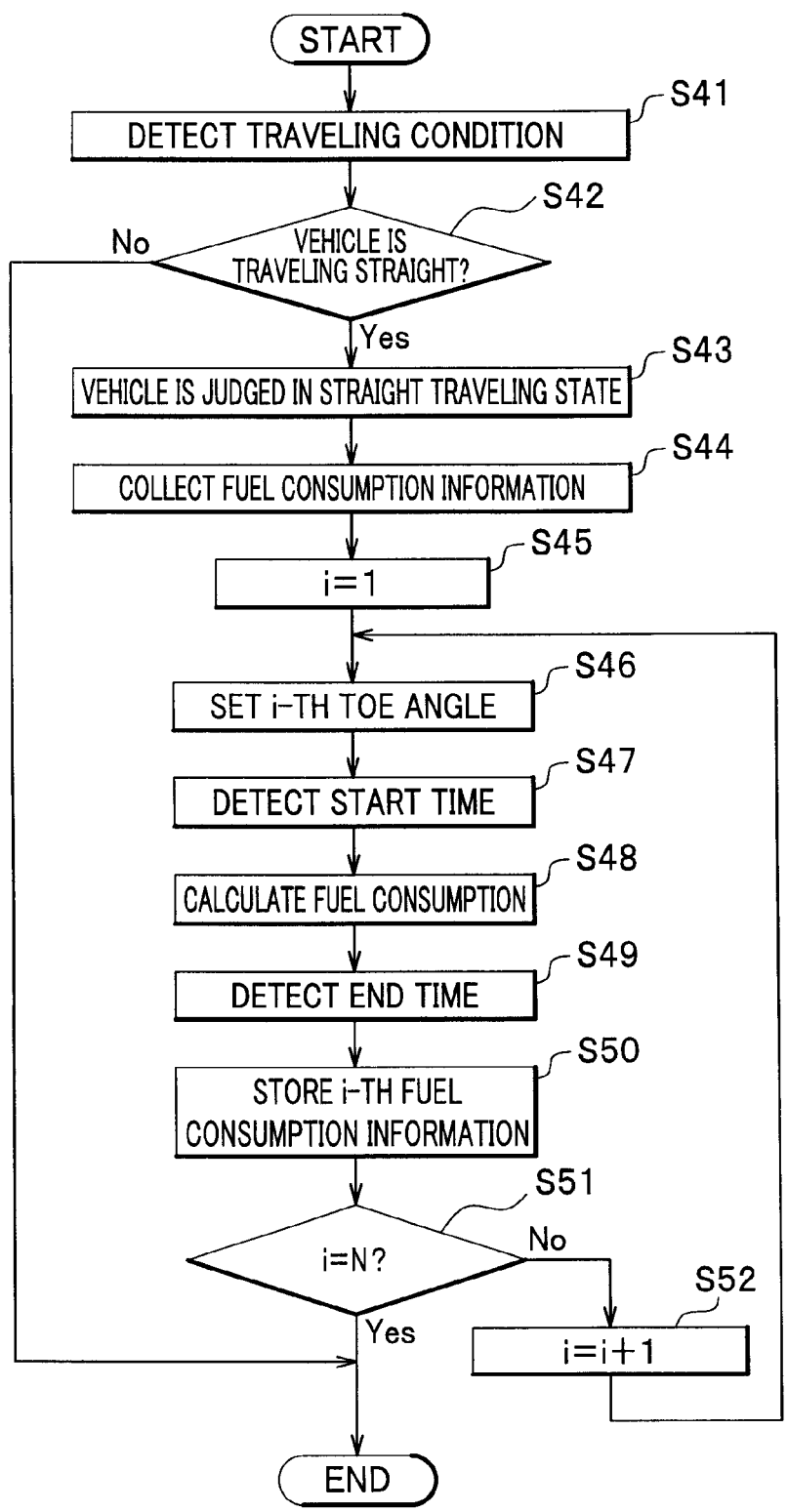
FIG. 11 is a flowchart explaining a process for collecting the fuel consumption related information corresponding to a trial toe angle to create the fuel consumption table according to the third embodiment.

The process for collecting fuel consumption related information corresponding to the respective trial toe angle to create the fuel consumption table will be described below with reference to the fuel consumption table 49a shown in FIG. 10 and the flowchart shown in FIG. 11. At this time, the fuel consumption will be calculated based on the case where the vehicle is in the straight traveling state. The toe angle is changed while the vehicle is in the straight traveling state. This is because the power loss caused by toe angle change is lower in the case where the toe angle is changed while the vehicle is in the straight traveling state than the case where the toe angle is changed while the vehicle is in the non-straight traveling state, such as while the vehicle is turning. However, the fuel consumption can be calculated regardless of whether the vehicle is in the straight traveling state or in the non-straight traveling state.

First, the vehicle speed, the steering torque, the yaw rate and the lateral acceleration are detected during travel to detect the traveling condition of the vehicle (Step S41). The method for detecting the traveling condition is identical to that of the first embodiment. Based on the detected results, it is determined whether or not the vehicle is traveling straight (Step S42). If it is determined that the vehicle is traveling straight (i.e., if it is determined "Yes" in Step S42), then the straight traveling state judging section 41 determines that the vehicle is in the straight traveling state, and the a control signal for setting the toe angle is input to the toe angle setting section 43 (Step S43). And if it is determined that the vehicle is not traveling straight (i.e., if it is determined "No" in Step S42), then the process ends without calculating the fuel consumption.

In the toe angle setting section 43, the fuel consumption information storage 49 is read out to determine a preset trial toe angle to start collecting the fuel consumption information (Step S44). First, the fuel consumption information for number "1" is started to be collected. Specifically, the row corresponding to number "1" of the fuel consumption table 49a shown in FIG. 10 is searched (Step S45). Then the toe angle "+0.1" of number "1" is extracted, so that the first toe angle is determined. The first toe angle is set by inputting a motor control signal to the motor drive section 45 so that the wheels are set to 0.1° toe-in (Step S46). When the first toe angle has been determined, the time information is input to the fuel consumption information storage 49 by the timer 42, so that the start time for calculating the fuel consumption is input (Step S47). In the fuel consumption table 49a of FIG. 10, the first start time is set to Jan. 19, 2007 8:00:00.

After the toe angle has been set, the fuel consumption calculating section 48 detects the quantity of the fuel injected by the FI 80 and calculates the fuel consumption (Step S48). The process for calculating the fuel consumption for three minutes from Jan. 19, 2007 8:00:00 to Jan. 19, 2007 8:03:00 is performed in the state where the wheels are set to the first toe angle of +0.1°.

Then the end time is detected in order to end the process for calculating the fuel consumption (Step S49). Specifically, the time information is input to the fuel consumption information storage 49 by the timer 42, and the time at which the calculation of the fuel consumption ends (namely, Jan. 19, 2007 8:03:00) is registered as the first "end time". In the toe angle setting section 43, the time information corresponding to the end time is read out and a control signal for ending the process for calculating the fuel consumption is output to the fuel consumption calculating section 48, and which ends the process for calculating the fuel consumption. Next, the fuel consumption of the first toe angle is registered in the fuel consumption table 49a, and thereby the fuel consumption information of the first toe angle is stored (Step S50). Since the calculated fuel consumption is 15.0 (km/l) when the toe angle is set to +0.1°, "15.0" is registered in the "fuel consumption" item of number "1".

The process from Step S46 to Step S50 will be repeated for each of the trial toe angles. In other words, in the case where there are N trial toe angles, every time when the fuel consumption corresponding to the i-th toe angle has been calculated, it is determined whether or not the number i equals to the number N (Step S51). If i equals to N (i.e., if it is determined "Yes" in Step S51), then the process for calculating the fuel consumption ends. And if i does not equal to N (i.e., if it is determined "No" in Step S51), which means i<N, then is increased by "1" (Step S52). Then the fuel consumption corresponding to the (1+1)-th toe angle is calculated (by the process from Step S46 to Step S50), and such process will be repeated until it is determined that i equals to N. After the fuel consumption corresponding to the first toe angle of +0.1° is calculated to be 15.0 (km/l), the second toe angle of "+0.2°" is set, the start time and end time, at which the calculation of the second fuel consumption is respectively started and ended, and the calculated fuel consumption are registered in the fuel consumption table 49a. The same process is repeated until the fuel consumption related information corresponding to the N-th toe angle has been registered.

Figure 12:
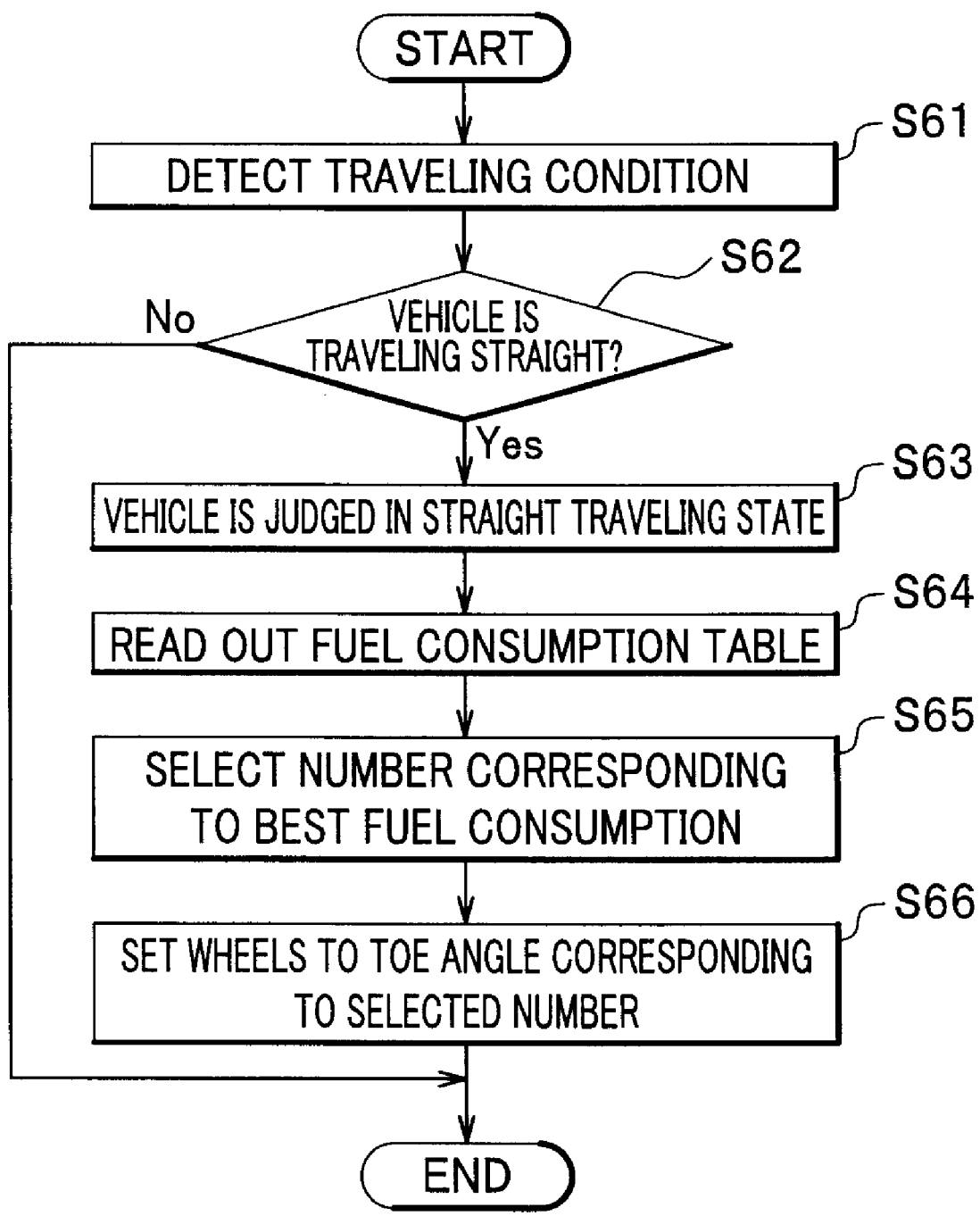
FIG. 12 is a flowchart explaining a process for selecting a toe angle resulting in the best fuel consumption and setting the wheels to the selected toe angle according to the third embodiment.

The process for selecting a toe angle which results in the best fuel consumption and setting the wheels to the selected toe angle will be described below with reference to the fuel consumption table 49a of FIG. 10 and the flowchart of FIG. 12. For the same reason as described above, the operation for setting the wheels to the selected toe angle is performed while the vehicle is in the straight traveling state. Since the process for determining whether or not the vehicle is in the straight traveling state from Step S61 to Step S63 is identical to that from Step S41 to Step S43 of the flowchart of FIG. 11, the description thereof will be skipped.

After it has been judged that the vehicle is in the straight traveling state, the fuel consumption table 49a is read out by the optimum fuel consumption selecting section 50 (Step S64). The fuel consumption table 49a is searched to extract the value of the best fuel consumption from the column "fuel consumption" and select the number corresponding to the extracted value of the best fuel consumption (Step S65). Since the value of the best fuel consumption is "15.2" in the fuel consumption table 49a of FIG. 10, number 3 is selected.

Next, a control signal is input from the optimum fuel consumption selecting section 50 to the toe angle setting section 43 so that the wheels are set to the toe angle corresponding to the selected number (Step S66). Since the third toe angle "+0.3°" is extracted, the rear wheels 2L, 2R are drive-controlled to be set to 0.3° toe-in.

According to the third embodiment, the following advantages can be achieved. Since the toe angle which results in the best fuel consumption is stored and learned, the toe angle at which the best fuel consumption is actually achieved can be found. Thus, the driver can empirically find an optimum toe angle for himself in accordance with the traveling state of the vehicle. Further, by periodically collecting the fuel consumption related information to update the fuel consumption table 49a, the optimum toe angle can be properly set in accordance with the wear of the tire.

4. Fourth Embodiment

Figure 13:
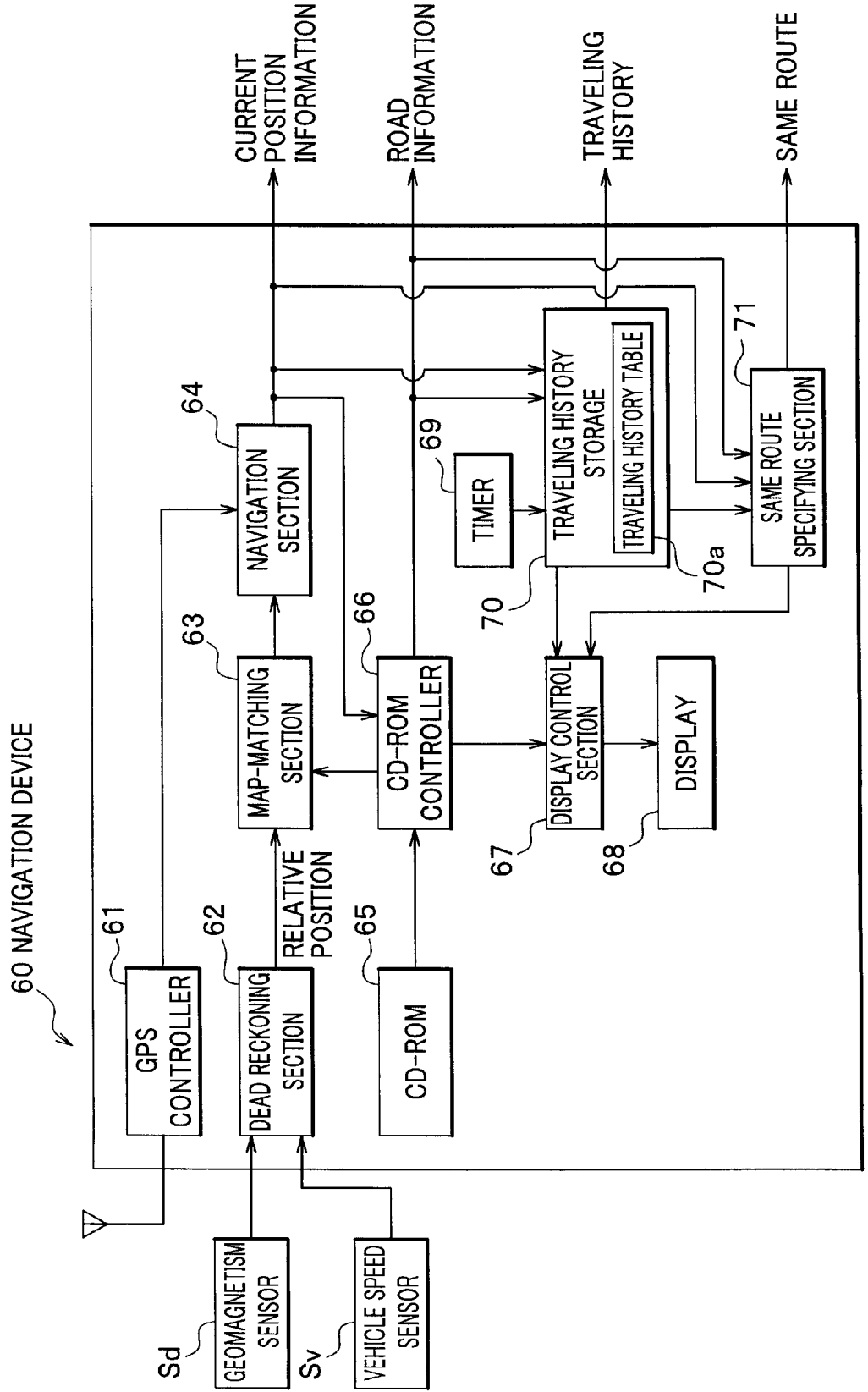
FIG. 13 is a block diagram showing a navigation device according to a fourth embodiment.
Figure 16:
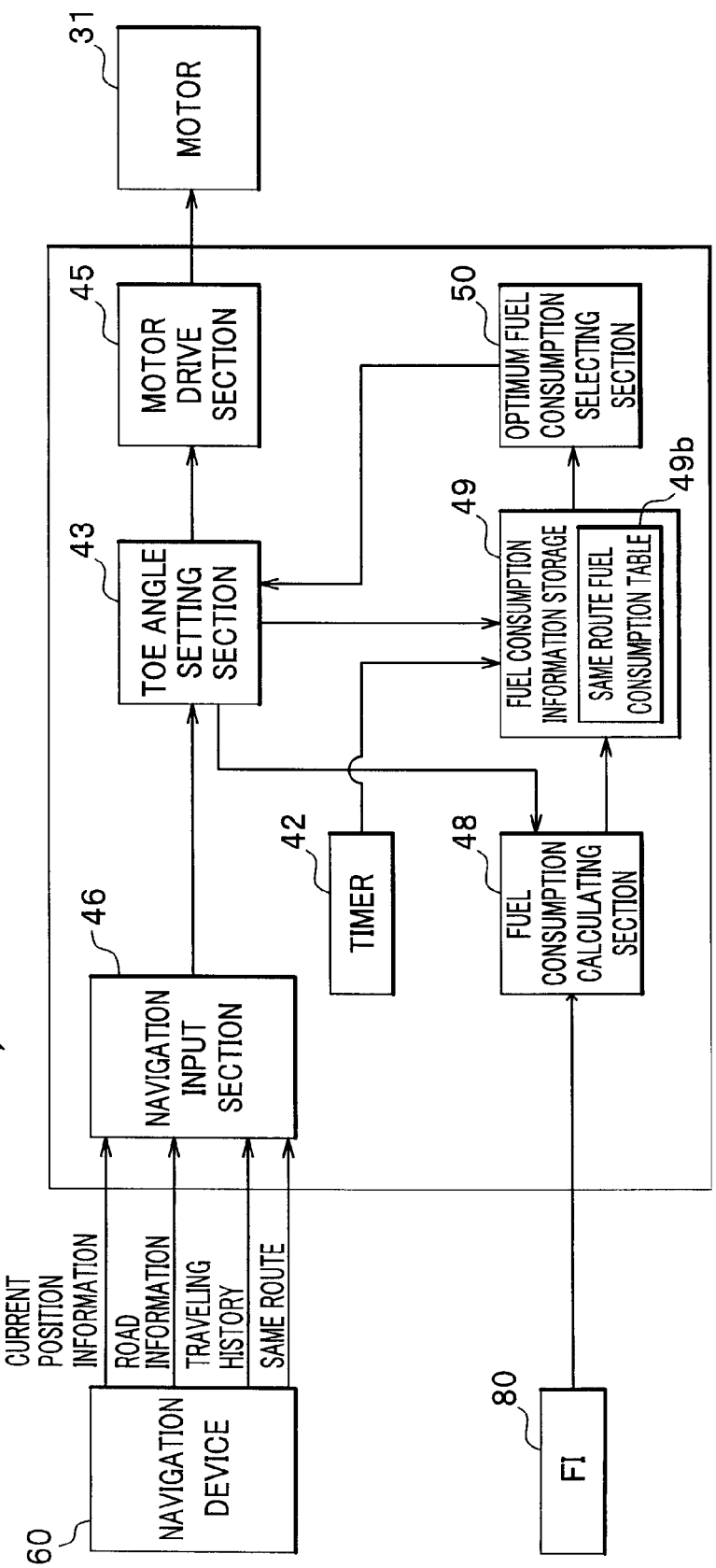
FIG. 16 is a block diagram showing a toe angle changing control ECU according to the fourth embodiment.

A fourth embodiment is about a technology which is: in a vehicle equipped with navigation device, when the navigation device recognizes that the vehicle is repeatedly traveling on the same route, the toe angle which actually results in the best fuel consumption is determined by intentionally changing the toe angle of the rear wheels 2L, 2R to different values during travel and calculating the fuel consumption for each of these values, while the vehicle is traveling on the same route. The details thereof will be described below. FIG. 13 is a block diagram showing the navigation device, and FIG. 16 is a block diagram showing a toe angle changing control ECU connected to the navigation device through a communication wire.

The construction of the navigation device will be described below with reference to FIG. 13. Compared with the navigation device of the second embodiment (see FIG. 6), a timer 69, a traveling history storage 70 having a traveling history table 70a, and a same route specifying section 71 are added in the fourth embodiment. The part identical to the second embodiment will not be described here again.

The traveling history storage 70 correlates the current position information with the road information contained in the map information and stores them therein, as traveling history related information, for each of the routes that the vehicle has ever traveled on. By collecting the traveling history related information, a later-mentioned traveling history table 70a (see FIG. 14) is created. Further, the traveling history related information is transmitted to the toe angle changing control ECU 37.

The same route specifying section 71 determines whether or not the route that the vehicle is currently traveling on is the same route as the one on which the vehicle has ever traveled to specify the same route, and transmits the information about the specified same route to the toe angle changing control ECU 37. Specifically, based on the current position information of the vehicle and the road information contained in the map information, the route that the vehicle is currently traveling on is specified, and the traveling history table 70a is read out. And the route that the vehicle has traveled on is searched to determine whether or not the searched route is the same route as the one on which the vehicle is currently traveling.

The information relevant to the traveling history and the same route is input to the display control section 67. The display control section 67 displays, through the display control section 67, not only a road map showing the periphery of the road that the vehicle is currently traveling on, but also a sign which indicates the route is the route that the vehicle has ever traveled on. For example, such a route can be displayed by different color, or a number can be shown which indicates the number of times that the vehicle has ever traveled on the route.

The structure of the traveling history related information stored in the traveling history table 70a will be described below with reference to FIG. 14. The table includes sequentially numbered rows. The sequential number indicates the order in which the traveling history is measured. Further, the items of the column of the table include "start node" which represents the node from which the route on which the vehicle has ever traveled starts; "end node" which represents the node at which the route on which the vehicle has ever traveled ends; "link ID" which specifies the road section linking the start node and the end node; "route" defined by the start node, the end node and the link ID; "start time" at which the vehicle passes the start node of the route; and "end time" at which the vehicle passes the end node of the route.

For example, the traveling history related information of number "1" is described below. The vehicle first passed the start node "a1" at the start time of Jan. 12, 2007 8:00:00. Then the vehicle passed the end node "a2" at the end time of Jan. 12, 2007 8:10:00, and at that time the vehicle was passing through the road section specified by the link ID "LA1". The start time and the end time are determined by the time information input by the timer 69. The current position information and the road information is read out, the name of the route corresponding to the nodes and the link ID being passed and is specified as "A1" and is registered as the traveling history related information of number "1". The sample data of the traveling history is collected by repeating the same registering sequence for number "2", "3", •••.

Figure 14:
FIG. 14 shows the structure of a traveling history table according to the fourth embodiment.

In FIG. 14, since the start node, the end node, and the link ID of the number "1" are identical to those of the number "66", the route "A1" is the same route. Thus, while the vehicle is passing through the route "A1" during the time between Jan. 15, 2007 7:59:00 and Jan. 15, 2007 8:09:00, the traveling history related information of the number "66" of the traveling history table 70a is created, and at the same time the information indicating that route "A1" is the same route is output to both the display control section 67 and the toe angle changing control ECU 37. Further, since the start node, the end node, and the link ID of the number "2" are identical to those of the number "67", the route "A2" is specified as the same route, and therefore the same process as performed for the route "A1" is performed for the route "A2".

Note that, in the present embodiment, the start node and the end node are adjacent to each other. Thus, if the start node and the end node can be specified, the link ID can be uniquely determined; and if the start node and the link ID can be specified, the end node can be uniquely determined. However, the present invention is not limited to such a method for specifying the above factors.

Figure 15:
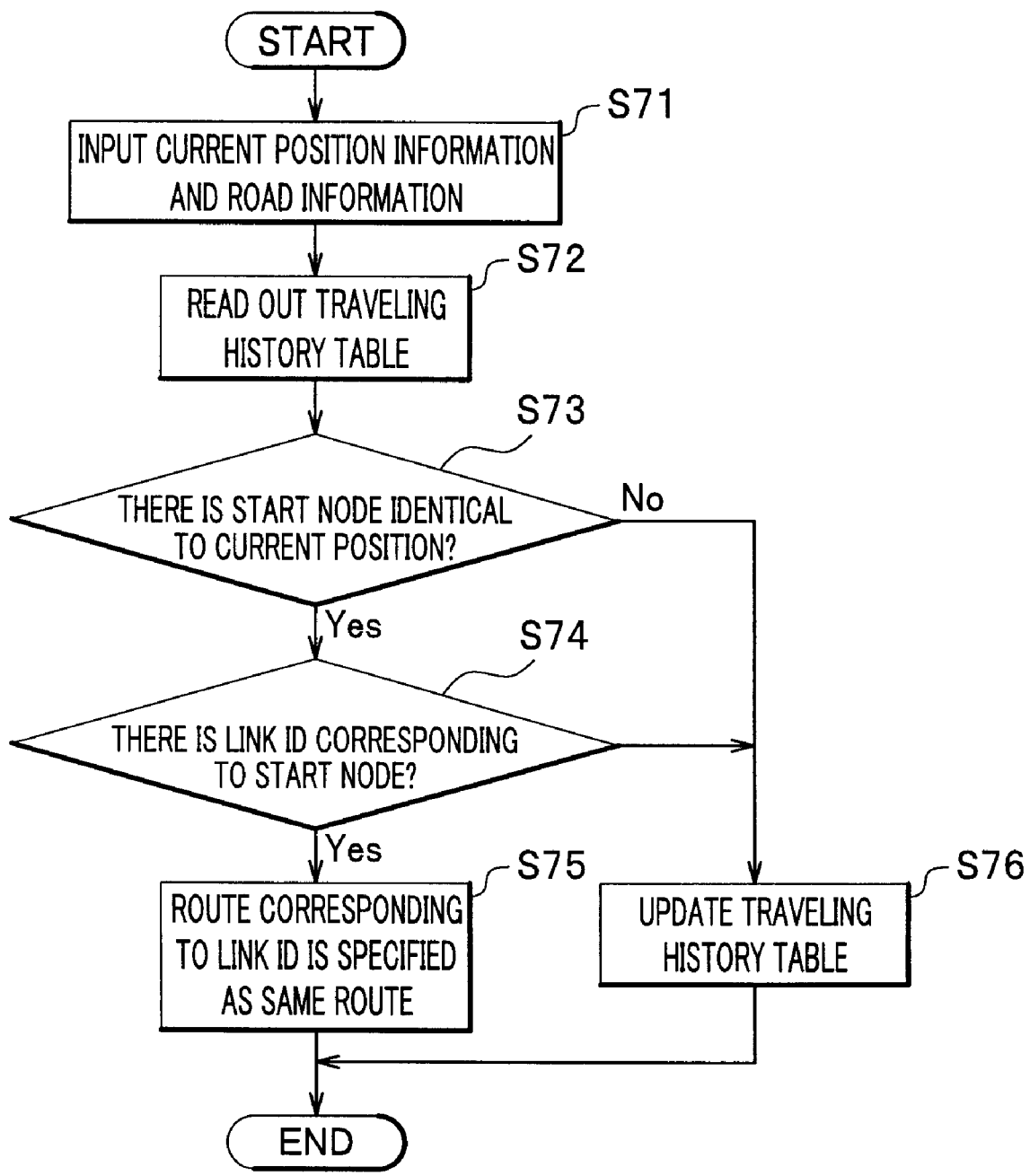
FIG. 15 is a flowchart explaining a process for specifying the same route with the navigation device according to the fourth embodiment.

A process for specifying the same route with the navigation device will be described below with reference to the traveling history table 70a of FIG. 14 and the flowchart of FIG. 15.

In the same route specifying section 71, the current node of the current vehicle position and the link ID are extracted by inputting the current position information and the road information contained in the map information (Step S71). Then the traveling history table 70a is read out to be searched to determine whether or not there is registered the same route as the one on which the vehicle is currently traveling (Step S72). Further, new traveling history related information is created based on the newly input current position information and the map information, and the start node, the end node, the link ID, the route, the start time and the end time are input corresponding to the newly created number.

The search is carried out with the item of "start node" to determine whether or not there is a start node identical to the node of the current position (Step S73). If there is a start node identical to the current node (i.e., if it is determined "Yes" in Step S73), then it is determined whether or not there is a link ID corresponding to the start node (Step S74). If there is not a start node identical to the current node (i.e., if it is determined "No" in Step S73), which means that the vehicle is traveling on a route on which it has never traveled, then a new traveling history related information is created, the traveling history table is updated, and which ends the process (Step S76).

In Step S74, it is determined whether or not the link ID corresponding to the road section of the route on which the vehicle is currently traveling is identical to the link ID corresponding to the start node identical to the current node. If there is link ID corresponding to the start node (i.e., if it is determined "Yes" in Step S74), then the route corresponding to the link ID is specified as the same route (Step S75). The information regarding the specified same route is output to the toe angle changing control ECU 37 which will be described later. The same route related information is input to the display 68 through the display control section 67, and the road corresponding to the same route is displayed in different color for example.

If there is not an identical link ID (i.e., if it is determined "No" in Step S74), which means that the vehicle is traveling on a route on which it has never traveled, then a new traveling history related information is created, the traveling history table is updated, and which ends the process (Step S76).

The construction of the toe angle changing control ECU connected to the navigation device through a communication wire will be described below with reference to FIG. 16. The toe angle changing control ECU 37 includes a navigation input section 46, a timer 42, a toe angle setting section 43, a motor drive section 45, a fuel consumption calculating section 48, a fuel consumption information storage 49 having a same route fuel consumption table 49b, and an optimum fuel consumption selecting section 50. Since the toe angle changing control ECU has the same basic function as that of the second embodiment, the part identical to the second embodiment will not be described herein.

The current position information, the road information, the traveling history, and the same route related information are input from the navigation device 60 to the navigation input section 46. By inputting the same route related information, a signal for setting the toe angle is input from the navigation input section 46 to the toe angle setting section 43, thereby a process for controlling the trial toe angle setting and for calculating the fuel consumption is started. The fuel consumption calculating section 48 calculates the fuel consumption at a set toe angle during the time while vehicle is traveling on the input same route.

The fuel consumption information storage 49 correlates the toe angle set by the toe angle setting section 43 with the fuel consumption calculated by the fuel consumption calculating section 48, and stores them therein as the same route fuel consumption related information for each of the same routes and for each of the trial toe angles. By collecting the stored fuel consumption related information, a later-mentioned same route fuel consumption table 49b (see FIG. 17) is created.

Figure 17:
FIG. 17 shows the structure of a same route fuel consumption table according to the fourth embodiment, in which the same route fuel consumption related information is stored.

The structure of the same route fuel consumption related information stored in the same route fuel consumption table 49b will be described below with reference to FIG. 17. FIG. 17 shows a fuel consumption table for the route that is determined to be the same route A1 of the traveling history table 70a of FIG. 14. The table includes sequentially numbered rows. The sequential number indicates the order in which the fuel consumption is measured. Further, the items of the column of the table include "number" which indicates the order in which the fuel consumption is measured, "toe Angle" which represents the trial toe angle at which the fuel consumption is to be measured, "fuel consumption" which represents the fuel consumption measured at the corresponding trial toe angle, "start time" which represents the time at which the measurement of the fuel consumption is started, and "end time" which represents the time at which the measurement of the fuel consumption is ended. For example, the same route fuel consumption related information of the number "1" can be described as: the wheels are set by the toe angle setting section 43 to 0.1° toe-in, and the fuel consumption is measured for three minutes from Jan. 15, 2007 8:00:00 to Jan. 15, 2007 8:03:00. The start time and the end time are determined by the time information input by the timer 42. The fuel consumption calculating section 48 then calculates the fuel consumption of this time period, and the calculated fuel consumption is 15.0 (km/l) in this case.

By repeating the same measuring sequence for number "2", "3", •••, the sample data of the fuel consumption corresponding to each of the trial toe angles while traveling on the same route A1 is collected. The sample data of the fuel consumption corresponding to each of the trial toe angles while traveling on the same route A2 or other same routes can be collected in the same manner.

Figure 18:
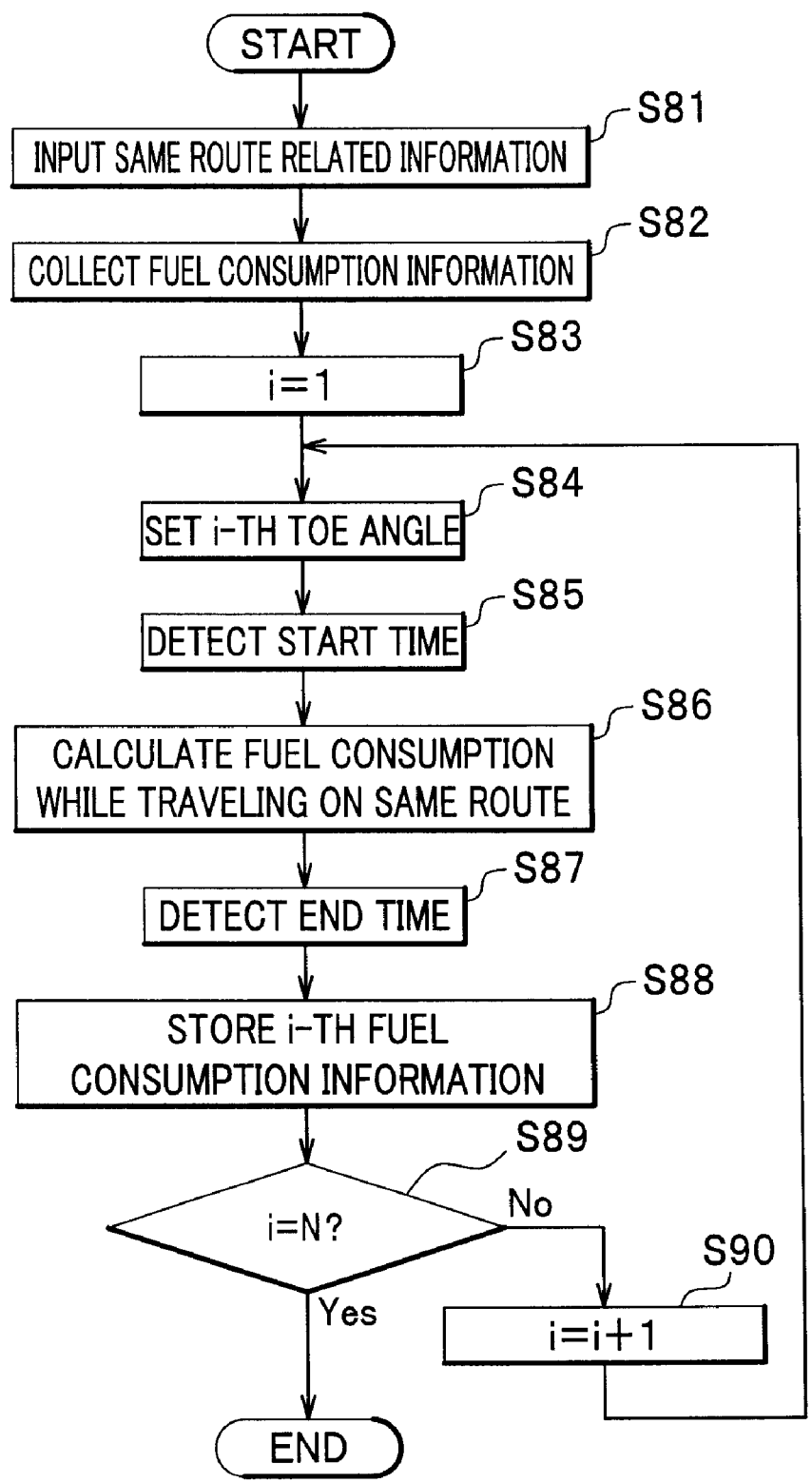
FIG. 18 is a flowchart explaining a process for collecting the same route fuel consumption related information corresponding to a trial toe angle to create the same route fuel consumption table according to the fourth embodiment.

The process for collecting the same route fuel consumption related information corresponding to each of the trial toe angles while traveling on the same route to create the same route fuel consumption table will be described below with reference to the same route fuel consumption table 49b shown in FIG. 17 and the flowchart shown in FIG. 18. The description is based on a precondition that the vehicle passes through the same route A1.

First, together with the current position information, the road information and the traveling history, the same route related information is input to the navigation input section 46 during travel (Step S81). By inputting the same route related information, it is recognized that the vehicle is currently traveling on the same route A1, so that a control signal for setting the toe angle is input to the toe angle setting section 43. In the toe angle setting section 43, the fuel consumption information storage 49 is read out to determine a preset trial toe angle to start collecting the fuel consumption information (Step S82).

First, the fuel consumption information for number "1" is started to be collected. Specifically, the row corresponding to number "1" of the same route A1 table of the same route fuel consumption table 49b shown in FIG. 17 is searched (Step S83). Then the toe angle "+0.1°" of number "1" is extracted, so that the first toe angle is determined. The first toe angle is set by inputting a motor control signal to the motor drive section 45 so that the wheels are set to 0.1° toe-in (Step S84). When the first toe angle has been set, the time information is input to the fuel consumption information storage 49 by the timer 42, so that the start time for calculating the fuel consumption is detected (Step S85). In the same route A1 table of FIG. 17, the first start time is set to Jan. 15, 2007 8:00:00.

After the toe angle has been set, the fuel consumption calculating section 48 detects the quantity of the fuel injected by the FI 80 and calculates the fuel consumption while traveling on the same route (Step S86). The process for calculating the same route fuel consumption for three minutes from Jan. 15, 2007 8:00:00 to Jan. 15, 2007 8:03:00 is performed in the state where the wheels are set to the first toe angle of +0.1°.

Then the end time is detected in order to end the process for calculating the fuel consumption (Step S87). Specifically, the time information is input to the fuel consumption information storage 49 by the timer 42, and the time at which the calculation of the fuel consumption ends (namely, Jan. 15, 2007 8:03:00) is registered as the first "end time" in the same route A1 table. In the toe angle setting section 43, the time information corresponding to the end time is read out and a control signal for ending the process for calculating the same route fuel consumption is output to the fuel consumption calculating section 48, and which ends the process for calculating the fuel consumption. Next, the fuel consumption of the first toe angle is registered in the same route A1 table of the same route fuel consumption table 49b, and thereby the fuel consumption information of the first toe angle is stored (Step S88). Since the calculated fuel consumption is 15.0 (km/l) when the toe angle is set to +0.1°, "15.0" is registered in the "fuel consumption" item of number "1".

The process from Step S84 to Step S90 will be repeated for each of the trial toe angles. Such a repeatedly conducted process and the process following which are identical to the process from Step S46 to Step S52 of above (see FIG. 11), therefore the description thereof will be skipped. As a result, N pieces of the same route fuel consumption related information are created for the same route A1 (see FIG. 17). Thereby the process for the same route A1 ends. When the vehicle passes through the same route A2 or other same routes, the process shown in FIG. 18 will be repeated.

Figure 19:
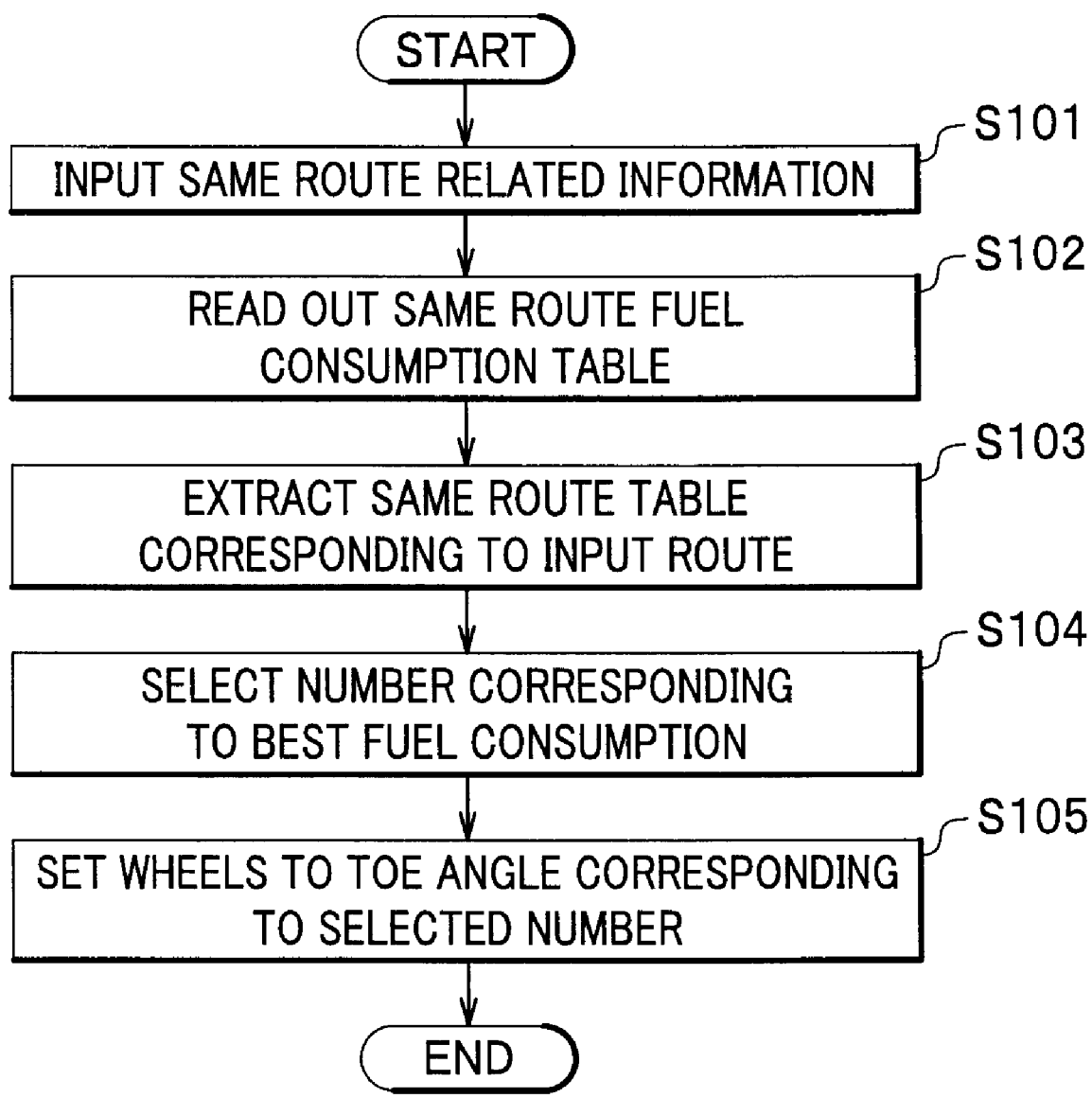
FIG. 19 is a flowchart explaining a process for selecting a toe angle resulting in the best fuel consumption and setting the wheels to the selected toe angle according to the fourth embodiment.

The process for selecting a toe angle which results in the best fuel consumption and setting the wheels to the selected toe angle will be described below with reference to the same route fuel consumption table 49b of FIG. 17 and the flowchart of FIG. 19. The description is based on a precondition that the vehicle passes through the same route A1.

First, together with the current position information, road information and the traveling history, the same route related information is input to the navigation input section 46 during travel (Step S101). By inputting the same route related information, it is recognized that the vehicle is currently traveling on the same route A1, so that a control signal for setting the toe angle is input to the toe angle setting section 43.

After the same route related information has been input, the same route fuel consumption table 49b is read out by the optimum fuel consumption selecting section 50 (Step S102). Further, the same route A1 table corresponding to the input route is extracted from the same route fuel consumption table 49b (Step S103). The same route A1 table is searched to extract the value of the best fuel consumption from the column "fuel consumption" and select the number corresponding to the extracted the value of the best fuel consumption (Step S104). Since the value of the best fuel consumption is "15.2" in the same route A1 table of the same route fuel consumption table 49b of FIG. 17, number 3 is selected.

Next, a control signal is input from the optimum fuel consumption selecting section 50 to the toe angle setting section 43 so that the wheels are set to the toe angle corresponding to the selected number (Step S105). Since the third toe angle "+0.3°" in the same route A1 table is extracted, the rear wheels 2L, 2R are drive-controlled to be set to 0.3° toe-in.

According to the fourth embodiment, the following advantages can be achieved. Since the toe angle which results in the best fuel consumption is stored and learned for each of the same routes, the toe angle at which the best fuel consumption is actually achieved can be found. Thus, the driver can empirically find an optimum toe angle for each of the same routes by himself. The same route can be, for example, the driver's commuter route from home to work, where the driver drives the vehicle from home to work on the same route and in the same time. By empirically finding an optimum toe angle for his commute route, the driver can reach the best fuel consumption.

5. Fifth Embodiment

Figure 20:
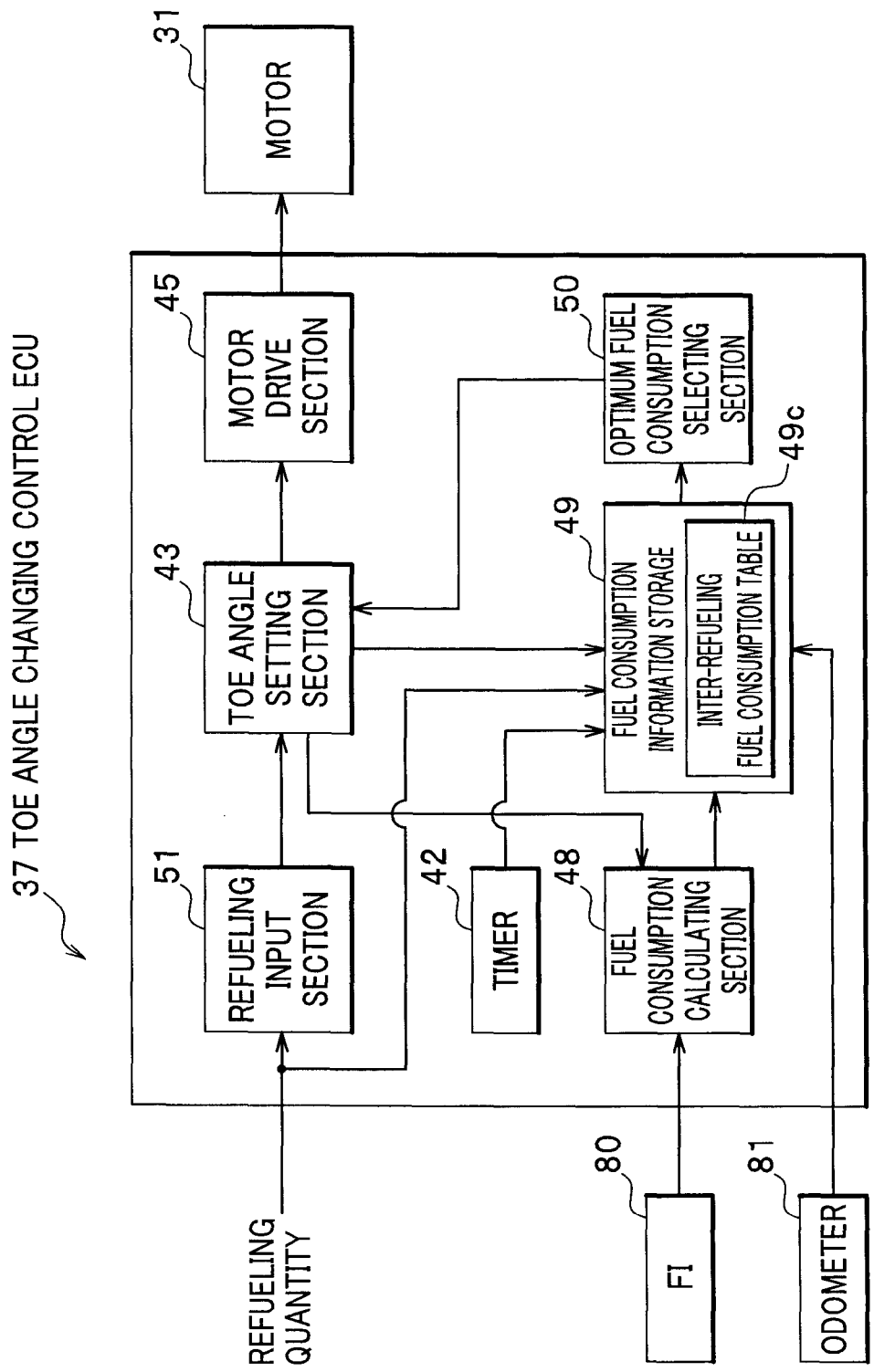
FIG. 20 is a block diagram showing a toe angle changing control ECU according to a fifth embodiment.

In a fifth embodiment, the rear wheels 2L, 2R are set to different toe angles every time the vehicle is refueled, so that by measuring the fuel consumption between the refueling service received this time and the refueling service received next time (referred to as "inter-refueling fuel consumption" hereinafter) for each of the set toe angles, the toe angle which actually results in the best inter-refueling fuel consumption can be determined. The details thereof will be described below. FIG. 20 is a block diagram showing a toe angle changing control ECU according to the fifth embodiment.

The description is based on a precondition that the vehicle passes through the substantially same route between the refueling service received this time and the refueling service received next time.

The case can be, for example, a driver drives the vehicle from home to work substantially on the same commute route and in the same time. Further, service stations located on the commute route are generally used when refueling the vehicle. Since the vehicle traveling only on the specified route has substantially the same inter-refueling traveling conditions, a toe angle which results in the best inter-refueling fuel consumption can be found.

As shown in FIG. 20, the toe angle changing control ECU 37 includes a refueling input section 51, a timer 42, a toe angle setting section 43, a motor drive section 45, a fuel consumption calculating section 48, a fuel consumption information storage 49 having an inter-refueling fuel consumption table 49c, and an optimum fuel consumption selecting section 50. Since the toe angle changing control ECU has the same basic function as that of the first and third embodiments, the part identical to the first and third embodiments will not be described here again.

The refueling input section 51 is an interface connected with an input device (not shown) through a communication wire. The input device is connected with a fuel filling port device through a communication wire. The fuel filling port device has a fuel filling port lid which is opened/closed when refueling the vehicle. The input device can input the refueling quantity when the vehicle has been refueled, and the refueling quantity related information is input to both the refueling input section 51 and the fuel consumption information storage 49. By inputting the refueling quantity related information, a control signal for setting the toe angle is input from the refueling input section 51 to the toe angle setting section 43.

In the fuel consumption information storage 49, when the refueling quantity is input, the total traveling distance is input from an odometer 81, and the time information is input from the timer 42. The toe angle set by the toe angle setting section 43, the fuel consumption calculated by the fuel consumption calculating section 48, the refueling quantity, total traveling distance and the time when the refueling quantity is input are correlated with each other and stored as inter-refueling fuel consumption related information for each of the trial toe angles. By collecting the stored inter-refueling fuel consumption related information, a later-mentioned inter-refueling fuel consumption table 49c (see FIG. 21) is created. Incidentally, the trial toe angle can be properly set and changed, and it is preferred to select the angle near the toe angle which actually results in the best inter-refueling fuel consumption.

Figure 21:
FIG. 21 shows the structure of an inter-refueling fuel consumption table according to the fifth embodiment, in which inter-refueling fuel consumption related information s stored.

The structure of the inter-refueling fuel consumption related information stored in the inter-refueling fuel consumption table 49c will be described below with reference to FIG. 21. The table includes sequentially numbered rows. The sequential number indicates the order in which the fuel consumption is measured. Further, the items of the column of the table include "number" which indicates the order in which the fuel consumption is measured, "toe Angle" which represents the trial toe angle at which the fuel consumption is to be measured, "fuel consumption" which represents the fuel consumption measured at the corresponding trial toe angle, the input "refueling quantity", "total traveling distance" displayed in the odometer 81 when the refueling quantity is input, and "inputting time" which represents the time when the refueling quantity is input. For example, the inter-refueling fuel consumption related information of the number "1" can be described as: the wheels are set to "+0.1" by the toe angle setting section 43, the refueling quantity of 80 (l) is filled after the vehicle has traveled at a state where the toe angle is set to "+0.1", the total traveling distance displayed in the odometer 81 is 10,000 (km), and the time when the refueling quantity is input is Jan. 19, 2007 8:03:00. In such a case, the total traveling distance at the time when the toe angle is set to "+0.1" after refueling is previously stored. Thus, the difference of the total traveling distances is calculated, and the fuel consumption in the state where the toe angle is set to "+0.1" is calculated to be "15.0" by dividing the difference by the refueling quantity of 80 (l) filled after the vehicle has traveled at the state where the toe angle is set to "+0.1".

When the next refueling is conducted at Jan. 26, 2007 8:12:00, the inter-refueling fuel consumption related information of number "2" is created. The inter-refueling fuel consumption related information of the number "2" can be described as: the wheels are set to "+0.2" by the toe angle setting section 43, the refueling quantity of 80 (l) is filled after the vehicle has traveled at a state where the toe angle is set to "+0.2", the total traveling distance displayed in the odometer 81 is 11,208 (km), and the time when the refueling quantity is input is Jan. 26, 2007 8:12:00. Thus, the difference of the total traveling distances is calculated to be 11,208−10,000=1,208 (km), and the fuel consumption in the state where the toe angle is set to "+0.2" is calculated to be "15.0" by dividing the difference 1,208 (km) by the refueling quantity 80 (l) filled after the vehicle has traveled at the state where the toe angle is set to "+0.2".

By repeating the same calculating sequence of the inter-refueling fuel consumption for number "3", "4", •••, the sample data of the fuel consumption corresponding to each trial toe angle of inter-refueling is collected.

Figure 22:
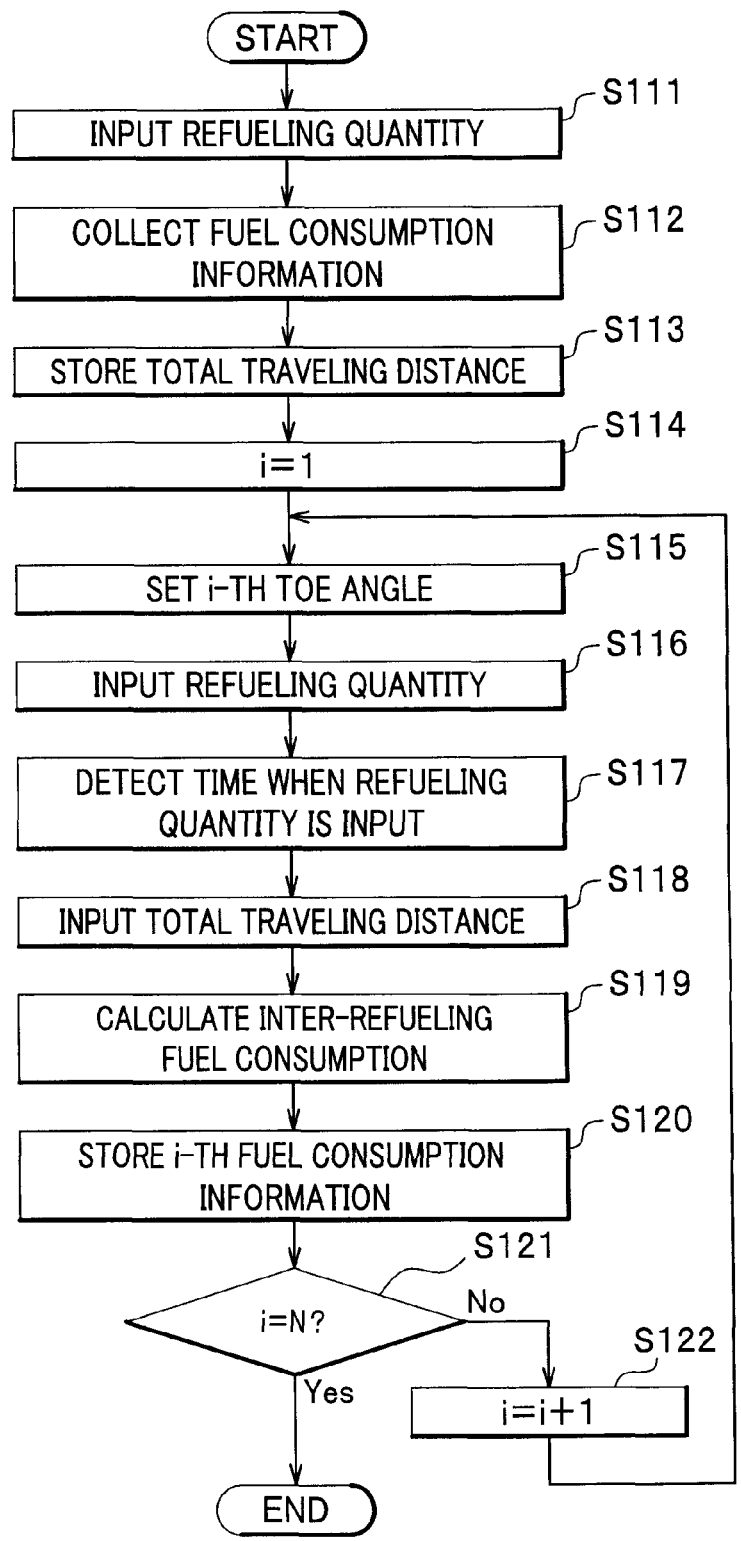
FIG. 22 is a flowchart explaining a process for collecting the inter-refueling fuel consumption related information corresponding to a trial toe angle to create the inter-refueling fuel consumption table 49c according to the fifth embodiment.

The process for collecting the inter-refueling fuel consumption related information corresponding to the respective trial toe angle of the inter-refueling to create the inter-refueling fuel consumption table will be described below with reference to the inter-refueling fuel consumption table 49c shown in FIG. 21 and the flowchart shown in FIG. 22.

First, in the refueling input section 51, the refueling quantity is input (Step S111). By inputting the refueling quantity, it is recognized that the vehicle is receiving the refueling service, and therefore a control signal for setting the toe angle is input to the toe angle setting section 43. In the toe angle setting section 43, the fuel consumption information storage 49 is read out to determine a preset trial toe angle to start collecting the fuel consumption information (Step S112). The total traveling distance at the start time is previously input from the odometer 81 to the fuel consumption information storage 49 (Step S113).

First, the inter-refueling fuel consumption related information for number "1" is started to be collected. Specifically, the row corresponding to number "1" of the inter-refueling fuel consumption table 49c shown in FIG. 21 is searched (Step S114). Then the toe angle "+0.1" of number "1" is extracted, so that the first toe angle is determined. The first toe angle is set by inputting a motor control signal to the motor drive section 45 so that the wheels are set to 0.1° toe-in (Step S115).

After the toe angle has been set, the vehicle travels for a period until next refueling. When conducting next refueling, in the refueling input section 51, the refueling quantity is input (Step S116). Then the time when the refueling quantity is input is detected by the timer 42 (Step S117). Then the total traveling distance displayed in the odometer 81 when inputting the refueling quantity is input (Step S118). The input refueling quantity, the total traveling distance, and the time when the refueling quantity is input are stored in the inter-refueling fuel consumption table 49c as the first fuel consumption information.

Then, in the fuel consumption calculating section 48, the inter-refueling fuel consumption table 49c is read out to calculate the inter-refueling fuel consumption (Step S119). The difference of the total traveling distances is divided by the input refueling quantity to calculate the inter-refueling fuel consumption at the state where the toe angle is set to "+0.1". The calculated inter-refueling fuel consumption is stored in the inter-refueling fuel consumption table 49c as the first fuel consumption information (Step S120).

The process from Step S115 to Step S120 will be repeated for each of the trial toe angles. In other words, in the case where there are N trial toe angles, every time when the inter-refueling fuel consumption corresponding to the i-th toe angle has been calculated, it is determined whether or not the number i equals to the number N (Step S121). If i equals to N (i.e., if it is determined "Yes" in Step S121), then the process for calculating the inter-refueling fuel consumption ends. And if i does not equal to N (i.e., if it is determined "No" in Step S121), which means i<N, then i is increased by "1" (Step S122). Then the fuel consumption corresponding to the (i+1)-th toe angle is calculated (by the process from Step S115 to Step S120), and such process will be repeated until it is determined that i equals to N. As a result, the fuel consumption information of N trial toe angles is created.

Figure 23:
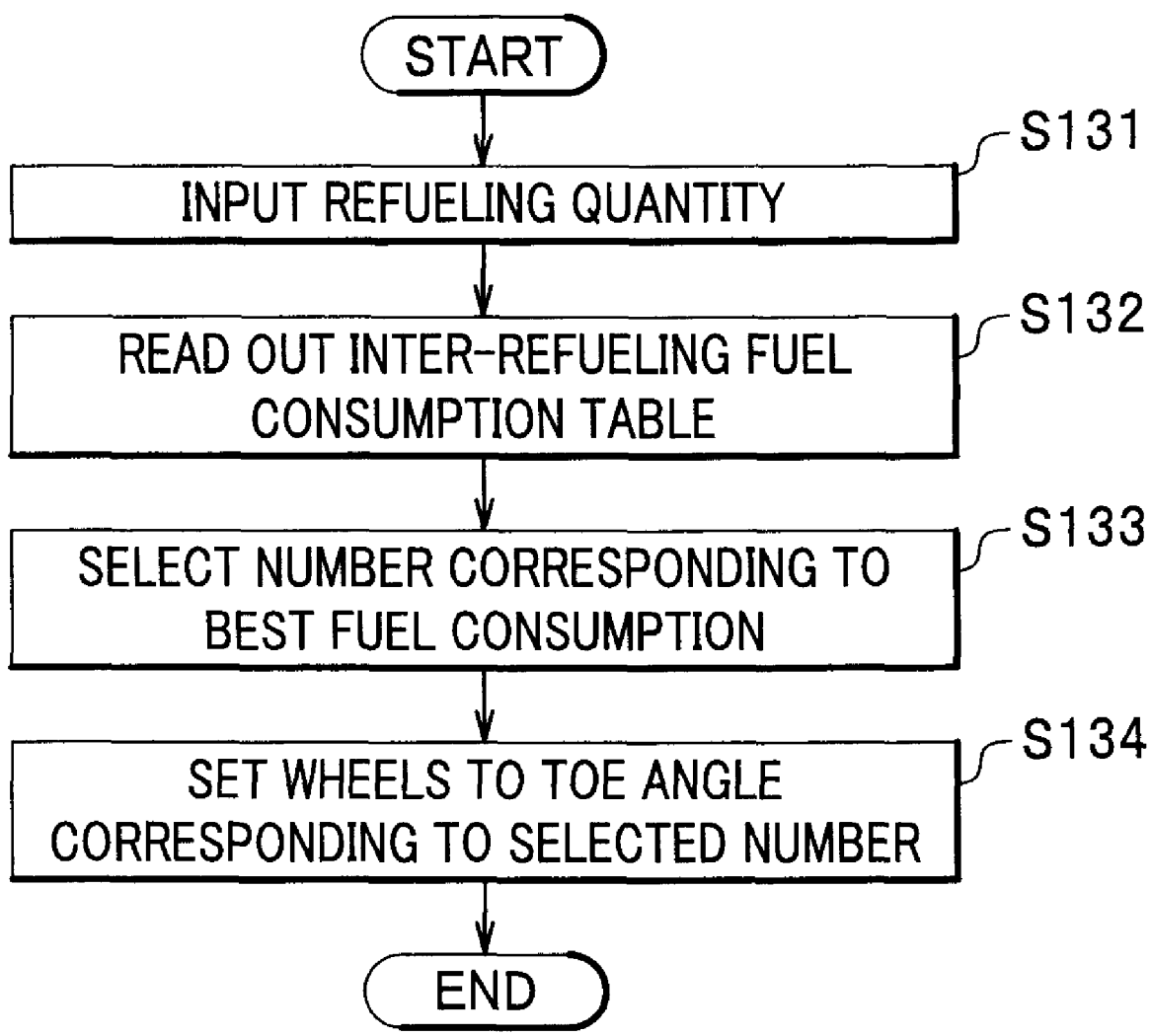
FIG. 23 is a flowchart explaining a process for selecting a toe angle resulting in the best fuel consumption and setting the wheels to the selected toe angle according to the fifth embodiment.

The process for selecting a toe angle which results in the best fuel consumption and setting the wheels to the selected toe angle will be described below with reference to the inter-refueling fuel consumption table 49c of FIG. 21 and the flowchart of FIG. 23.

First, in the refueling input section 51, the refueling quantity is input (Step S131). By inputting the refueling quantity, it is recognized that the vehicle is receiving the refueling service, and therefore a control signal for setting the toe angle is input to the toe angle setting section 43.

After the vehicle has been refueled, the inter-refueling fuel consumption table 49c is read out by the optimum fuel consumption selecting section 50 (Step S132). The inter-refueling fuel consumption table 49c is searched to extract the value of the best fuel consumption from the column "fuel consumption" and select the number corresponding to the extracted the value of the best fuel consumption (Step S133). Since the value of the best fuel consumption is "15.2" in the inter-refueling fuel consumption table 49c of FIG. 21, number 3 is selected.

Next, a control signal is input from the optimum fuel consumption selecting section 50 to the toe angle setting section 43 so that the wheels are set to the toe angle corresponding to the selected number (Step S134). Since the third toe angle "+0.3" in the inter-refueling fuel consumption table 49c is extracted, the rear wheels 2L, 2R are drive-controlled to be set to 0.3° toe-in.

According to the fifth embodiment, the following advantages can be achieved. Since the toe angle which results in the best fuel consumption is stored and learned every time when the vehicle is refueled, the toe angle at which the actually best fuel consumption is achieved can be found. To a driver who only drives the vehicle on a specified route such as a commute route, a toe angle which results in the best fuel consumption when traveling on the specified route can be empirically found.

Note that, though the above embodiments represent the best modes for carrying out the present invention, the present invention is not intended to be limited thereto. Thus, various modifications and variations can be made without departing from the spirit of the present invention.

In the first and third embodiments, each toe angle changing control ECU 37 is provided with the straight traveling state judging section 41 to determine whether or not the vehicle is in the straight traveling state. However, the toe angle changing control system may have such a configuration in which the steering control ECU 130 is provided with the straight traveling state judging section 41 which outputs a control signal to each of the toe angle changing control ECUs 37 corresponding to rear wheels 2L, 2R when it has been determined that the vehicle is in the straight traveling state. With such a configuration, the changing control of the toe angle of one toe angle changing control ECU 37 can be matched with the changing control of the toe angle of the other toe angle changing control ECU 37.

In the second embodiment, the information acquired from the navigation device is used to estimate whether or not the vehicle is in the straight traveling state. However, the following configuration can be adopted in which, for example, imaging data obtained from a front monitoring camera, or measurement value obtained from a front monitoring radar device such as laser radar and millimetric-wave radar is used to estimate whether or not the vehicle is in the straight traveling state.

In the fourth embodiment, the same route is specified by the navigation device, and the toe angle changing control device determines a toe angle corresponding to the specified same route. However, the configuration is not limited to the fourth embodiment, but can be a fuel consumption management device of a vehicle equipped with a toe angle changing control device for controlling the change of the toe angle of the wheels, the fuel consumption management device including: a storage for storing route section related information where the route section is formed by dividing a traveling route into a plurality of route sections (refer to FIG. 14); a traveling position detecting means for detecting the traveling position of the vehicle; a route section detecting means (refer to FIG. 13) which detects whether or not the traveling position detected by the traveling position detecting means is located in the route sections stored in the storage, and if yes, specifies the route section in which the traveling position is located; a toe angle changing means which changes the toe angle every time the route section is changed based on the detection result of the route section detecting means; a fuel consumption calculating means which calculates the fuel consumption for each of the route sections; and a fuel consumption information registration means which stores the calculated fuel consumption and the set toe angle in association with each other in the storage. With such a configuration, the fuel consumption is calculated for each of the route sections of the traveling route, the toe angle at which the actually best fuel consumption is achieved can be determined for each of the route sections of the traveling route. Thus, an optimum toe angle in accordance with the traveling state of the vehicle can be empirically found out every time the route section is changed.

In the fifth embodiment, the fuel consumption is calculated from the difference of the total traveling distances and the refueling quantity. However, the configuration may be the one in which a signal which indicates that a refueling service is received is input, instead of inputting the refueling quantity, and the fuel consumption during a predetermined period after refueling is calculated. The signal which indicates that a refueling service is received can be input in the following manner for example: A sensor for detecting the opening/closing of the fuel filling port lid of the fuel filling port device is provided in the vicinity of the fuel filling port lid. When the fuel filling port lid is open, a detecting signal which indicates that the fuel filling port lid is open is input to the refueling input section 51. Then a trial toe angle is set, and the fuel consumption calculating section 48 performs the process for calculating the fuel consumption. In the fuel consumption calculating section 48, the inter-refueling fuel consumption is calculated by detecting the quantity of the fuel injected by the FI 80 during the predetermined period to calculate the fuel consumption in this period.

Further, the above embodiments describe the device for the controlling the toe angle of the wheels, which is an example of controlling the alignment of wheels of a vehicle. As another example of controlling the alignment of wheels of a vehicle, it is possible to control the camber angle of the wheels. In a device for controlling the camber angle of the wheels, it is preferred that an actuator is provided to an arm such as an upper arm or a lower arm fixed near the center of each wheel.

What is claimed is:

1. An alignment changing control device for controlling an alignment of wheels of a vehicle, comprising:
    a straight traveling state judging unit configured to judge whether the vehicle is in a straight traveling state based on detection results of traveling condition of the vehicle;
    an alignment storage unit configured to store in advance, as data irrespective of a traveling history of the vehicle of a driver, an optimum toe angle suitable for improving fuel consumption while the vehicle is in the straight traveling state;
    an alignment setting unit configured to set the wheels to the optimum toe angle stored in the alignment storage unit if the straight traveling state judging unit judges that the vehicle is in the straight traveling state when the vehicle has been running straight for a predetermined time;
    a fuel consumption trial unit configured to set the toe angle of the wheels to be a trial toe angle while the vehicle is running straight, the trial toe angle being a toe angle for improving fuel consumption, and to repeatedly perform trials, by changing trial toe angles, and calculating the fuel consumption in the case where the vehicle is running at the set trial toe angle;
    a fuel consumption information storage unit configured to correlate each of the trial toe angles with the fuel consumption calculated at the each of the trial toe angles, and to store, as a result of the trials, information which is related to the fuel consumptions corresponding to a plurality of the different trial toe angles together with time stamps representing times at which the trials are performed; and
    a selecting unit configured to read out the information related to the fuel consumptions from the fuel consumption information storage unit and to select a toe angle at which the fuel consumption is best in the read information related to the fuel consumption, wherein the toe angle is set to be the toe angle selected by the selecting unit.

2. The alignment changing control device according to claim 1, wherein
    the straight traveling state judging element is configured to estimate whether the vehicle will be in the straight traveling state ahead in the traveling direction; and
    the alignment setting unit is configured to set the wheels to the toe angle stored in the alignment storage unit if the straight traveling state judging unit estimates that the vehicle will be in the straight traveling state ahead in the traveling direction.

* * * * *